US012683749B2

(12) United States Patent
Horita

(10) Patent No.: US 12,683,749 B2

(45) Date of Patent: Jul. 14, 2026

(54) INFORMATION PROCESSING DEVICE, COMMUNICATION DEVICE, AND INFORMATION PROCESSING METHOD

(71) Applicant: Sony Group Corporation, Tokyo (JP)

(72) Inventor: Koki Horita, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 302 days.

(21) Appl. No.: 18/697,824

(22) PCT Filed: Oct. 12, 2022

(86) PCT No.: PCT/JP2022/038088
§ 371 (c)(1),
(2) Date: Apr. 2, 2024

(87) PCT Pub. No.: WO2023/068145
PCT Pub. Date: Apr. 27, 2023

(65) Prior Publication Data
US 2025/0240699 A1     Jul. 24, 2025

(30) Foreign Application Priority Data

Oct. 19, 2021    (JP) ................................. 2021-171141

(51) Int. Cl.
*H04L 5/00*          (2006.01)
*H04L 41/0896*      (2022.01)
            (Continued)

(52) U.S. Cl.
CPC .......... *H04L 5/0092* (2013.01); *H04L 5/0001* (2013.01); *H04L 41/0896* (2013.01); *H04L 47/22* (2013.01); *H04W 72/29* (2023.01)

(58) Field of Classification Search
CPC ... H04L 5/0001; H04L 5/0091; H04L 5/0092; H04L 41/0896; H04L 47/22; H04W 72/29
See application file for complete search history.

(56) References Cited

U.S. PATENT DOCUMENTS

2008/0049672 A1* 2/2008 Barak .................... G06Q 40/04
                                                    370/328
2008/0207216 A1* 8/2008 Usuda .............. H04W 28/0257
                                                    455/453

(Continued)

FOREIGN PATENT DOCUMENTS

| JP | 2012-533937 A | 12/2012 |
| JP | 2021-082868 A | 5/2021 |
| WO | 2021/136637 A1 | 7/2021 |

OTHER PUBLICATIONS

"3rd Generation Partnership Project; Technical Specification Group Services and System Aspects; Study on application layer support for Factories of the Future in 5G network; (Release 17)", No. V17.0.0 Sep. 24, 2021 (Sep. 24, 2021), pp. 1-85, XP052056812.

(Continued)

*Primary Examiner* — Kevin C. Harper
(74) *Attorney, Agent, or Firm* — XSENSUS LLP

(57) ABSTRACT

An information processing device includes a control unit. The control unit determines, for each of communication paths, a communication period in which wireless communication and wired communication are performed by using communication paths between terminal devices connected to different base stations. The communication paths include wireless sections between the terminal devices and the base stations and a wired section between the different base stations. The control unit notifies the terminal devices and the base stations of information on the determined communication period.

12 Claims, 16 Drawing Sheets

(51) Int. Cl.
 _H04L 47/22_ (2022.01)
 _H04W 72/29_ (2023.01)

(56) References Cited

U.S. PATENT DOCUMENTS

| | | | | |
|---|---|---|---|---|
| 2009/0323621 | A1* | 12/2009 | Touboul | H04W 72/04 |
| | | | | 370/329 |
| 2016/0029404 | A1* | 1/2016 | Aryafar | H04W 72/542 |
| | | | | 370/277 |
| 2020/0044732 | A1* | 2/2020 | Cui | H04W 76/50 |
| 2020/0336382 | A1* | 10/2020 | Hong | H04L 41/0896 |
| 2021/0306910 | A1 | 9/2021 | Guo | |

OTHER PUBLICATIONS

Maik G Seewald et al: "Configuration Enhancements for Wireless TSN", IEEE Draft; DJ-SEEWALD-WIRELESS-TSN-0721-V01, IEEE-SA, Jul. 14, 2021 (Jul. 14, 2021), pp. 1-20,vol. 802.1, No. v01, Piscataway, NJ USA, XP068183350.
International Search Report and Written Opinion mailed on Dec. 27, 2022, received for PCT Application PCT/JP2022/038088, filed on Oct. 12, 2022, 09 pages including English Translation.

* cited by examiner

INFORMATION PROCESSING DEVICE, COMMUNICATION DEVICE, AND INFORMATION PROCESSING METHOD

CROSS-REFERENCE TO RELATED APPLICATIONS

The present application is based on PCT filing PCT/JP2022/038088, filed Oct. 12, 2022, which claims priority to Japanese Patent Application No. 2021-171141, filed Oct. 19, 2021, the entire contents of each are incorporated herein by reference.

FIELD

The present disclosure relates to an information processing device, a communication device, and an information processing method.

BACKGROUND

Developing communication technology has greatly improved communication performance such as large capacity, low delay, and high reliability. For example, also in wired communication such as Ethernet (registered trademark), a time sensitive network (TSN) has been studied for achieving low delay. The TSN is a network based on Ethernet. In the TSN, time synchronization is guaranteed, and real-time property can be secured.

CITATION LIST

Patent Literature

Patent Literature 1: JP 2021-82868 A

SUMMARY

Technical Problem

The above-described TSN is a technique that achieves high real-time property mainly in wired communication. In contrast, the communication network may include a wireless section in which wireless communication is performed in addition to a wired section in which wired communication is performed. As described above, achieving low delay also in a communication network including a wireless section and a wired section is desired.

Thus, the present disclosure provides an approach capable of achieving low delay in a communication network including a wireless section and a wired section.

Note that the above-described problem or object is merely one of a plurality of problems or objects that can be solved or achieved by a plurality of embodiments disclosed in the present specification.

Solution to Problem

An information processing device of the present disclosure includes a control unit. The control unit determines, for each of communication paths, a communication period in which wireless communication and wired communication are performed by using communication paths between terminal devices connected to different base stations. The communication paths include wireless sections between the terminal devices and the base stations and a wired section between the different base stations. The control unit notifies the terminal devices and the base stations of information on the determined communication period.

DESCRIPTION OF EMBODIMENTS

An embodiment of the present disclosure will be described in detail below with reference to the accompanying drawings. Note that, in the present specification and the drawings, components having substantially the same functional configuration are denoted by the same reference signs, and redundant description thereof will be omitted.

Furthermore, in the present specification and the drawings, a plurality of components having substantially the same functional configuration may be distinguished by attaching different numbers or alphabets after the same reference signs. For example, a plurality of configurations having substantially the same functional configuration is distinguished as terminal devices $400A_1$, $400A_2$, and $400A_3$, as necessary. Note, however, that, when it is unnecessary to particularly distinguish a plurality of components having substantially the same functional configuration, only the same reference signs are attached. For example, when it is unnecessary to particularly distinguish the terminal devices $400A_1$, $400A_2$, and $400A_3$, the terminal devices $400A_1$, $400A_2$, and $400A_3$ are simply referred to as terminal devices $400A$. Furthermore, when it is unnecessary to particularly distinguish terminal devices $400A$ and $400B$, the terminal devices $400A$ and $400B$ are simply referred to as terminal devices $400$.

Furthermore, although a description may be given by indicating specific values in the present specification and the drawings, the values are examples, and other values may be applied.

One or a plurality of embodiments (including examples and variations) to be described below can be implemented independently. In contrast, at least a part of the plurality of embodiments to be described below may be appropriately combined and implemented with at least a part of other embodiments. The plurality of embodiments can include different novel features. Therefore, the plurality of embodiments can contribute to achieving different objects or solving different problems, and may exhibit different effects.

1. Introduction

<1.1. One Example of Communication System>

Figure 1:
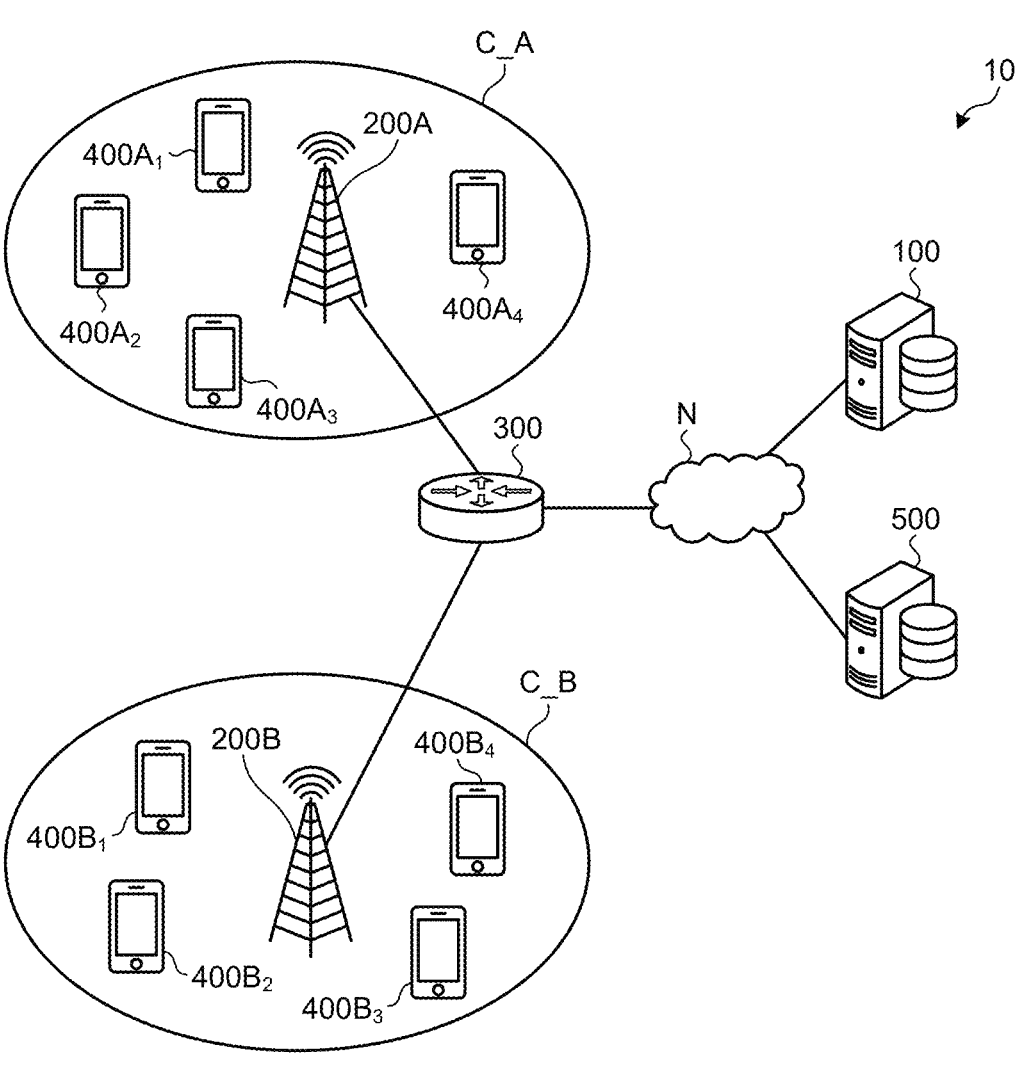
FIG. 1 illustrates a configuration example of a communication system according to a technique proposed in the present disclosure.

First, a communication system 10 according to a technique proposed in the present disclosure will be outlined. FIG. 1 illustrates a configuration example of the communication system 10 according to the technique proposed in the present disclosure.

The communication system 10 includes a control device 100, base stations 200, a relay station 300, terminal devices 400, and a game server 500.

For example, the communication system 10 provides game service to the terminal devices 400 at a site of a game tournament. In the site, a terminal device 400 plays a battle game with another terminal device 400 via the communication system 10, for example. The terminal devices 400 include display devices. Examples of the terminal devices 400 include smartphones.

In the example of FIG. 1, the communication system 10 includes a plurality of base stations 200A and 200B. The base stations 200A and 200B are installed at the site of the game tournament.

For example, the base station 200A is a communication device that operates a cell C_A and provides wireless communication service to terminal devices $400A_1$ to $400A_4$ located inside a coverage of the cell C_A. The cell C_A is operated in any wireless communication system such as LTE and NR.

For example, the base station 200B is a communication device that operates a cell C_B and provides wireless communication service to terminal devices $400B_1$ to $400B_4$ located inside a coverage of the cell C_B. The cell C_B is operated in any wireless communication system such as LTE and NR.

Note that, here, the base stations 200 provide cellular communication service at the site of the game tournament. That is, the base stations 200 provide local cellular networks (e.g., local 5G) at the site. Here, the local cellular networks can broadly include forms called a private network, a non public network, and the like.

The relay station 300 is, for example, a device that relays data (packets) transmitted and received in the communication system 10. The relay station 300 is, for example, a router or a switch. The relay station 300 is connected with the base stations 200 by wire, for example. The relay station 300 relays communication between the base stations 200. Note that, when the plurality of base stations 200 is directly connected, the relay station 300 may be omitted.

Furthermore, the relay station 300 is connected to a network N, and relays communication between the base stations 200 and the control device 100 or the game server 500. The network N may include a public network such as the Internet, a telephone network, and a satellite communication network, various local area networks (LANs) including Ethernet, a wide area network (WAN), and the like. The network N may include a dedicated network such as an internet protocol-virtual private network (IP-VPN). The network N may include a wireless communication network such as Wi-Fi (registered trademark) and Bluetooth (registered trademark).

The control device 100 is an information processing device that controls communication in the communication system 10. For example, the control device 100 schedules communications performed between the base stations 200, the relay station 300, and the terminal devices 400. For example, the control device 100 can be implemented as a part of a core network of wireless communication service provided by the base stations 200. Details of the scheduling performed by the control device 100 will be described later.

In the example of FIG. 1, the control device 100 is connected to the relay station 300 via the network N. Furthermore, the control device 100 is connected to the base stations 200 via the relay station 300. The control device 100 can be connected to the base stations 200 and the relay station 300 through paths different from those in the example of FIG. 1. For example, the control device 100 may be installed in the above-described site of the game tournament to be directly connected to the base stations 200 and the relay station 300. Furthermore, the control device 100 may be connected to the base stations 200 via a relay station (not illustrated) different from the relay station 300 in FIG. 1.

The game server 500 is a server device that provides game service to the terminal devices 400. The game server 500 performs control to provide a game screen, game voice, and the like in each terminal device 400 in conjunction with a game application operating in each terminal device 400.

Although, in the example of FIG. 1, the game server 500 is connected to the base stations 200 via the network N and the relay station 300, this is not a limitation. The game server 500 can be connected to the base stations 200 and the terminal devices 400 through paths different from those in the example of FIG. 1. For example, the game server 500 may be installed in the above-described site of the game tournament to be directly connected to the base stations 200. Furthermore, the game server 500 may be connected to the base stations 200 via a relay station (not illustrated) different from the relay station 300 in FIG. 1.

Note that, although, in FIG. 1, the communication system 10 includes two base stations 200, this is not a limitation. For example, the communication system 10 may include three or more base stations 200. Furthermore, although, in FIG. 1, the communication system 10 includes one relay station 300, this is not a limitation. For example, the communication system 10 may include two or more relay stations 300. Furthermore, two or more relay stations 300 may be provided between the base station 200A and the base station 200B.

Furthermore, although FIG. 1 illustrates a case where one base station 200 accommodates four terminal devices 400, this is not a limitation. Each base station 200 may accommodate three or less or five or more terminal devices 400. Furthermore, the base stations 200 may accommodate a different number of terminal devices 400.

Figure 2:
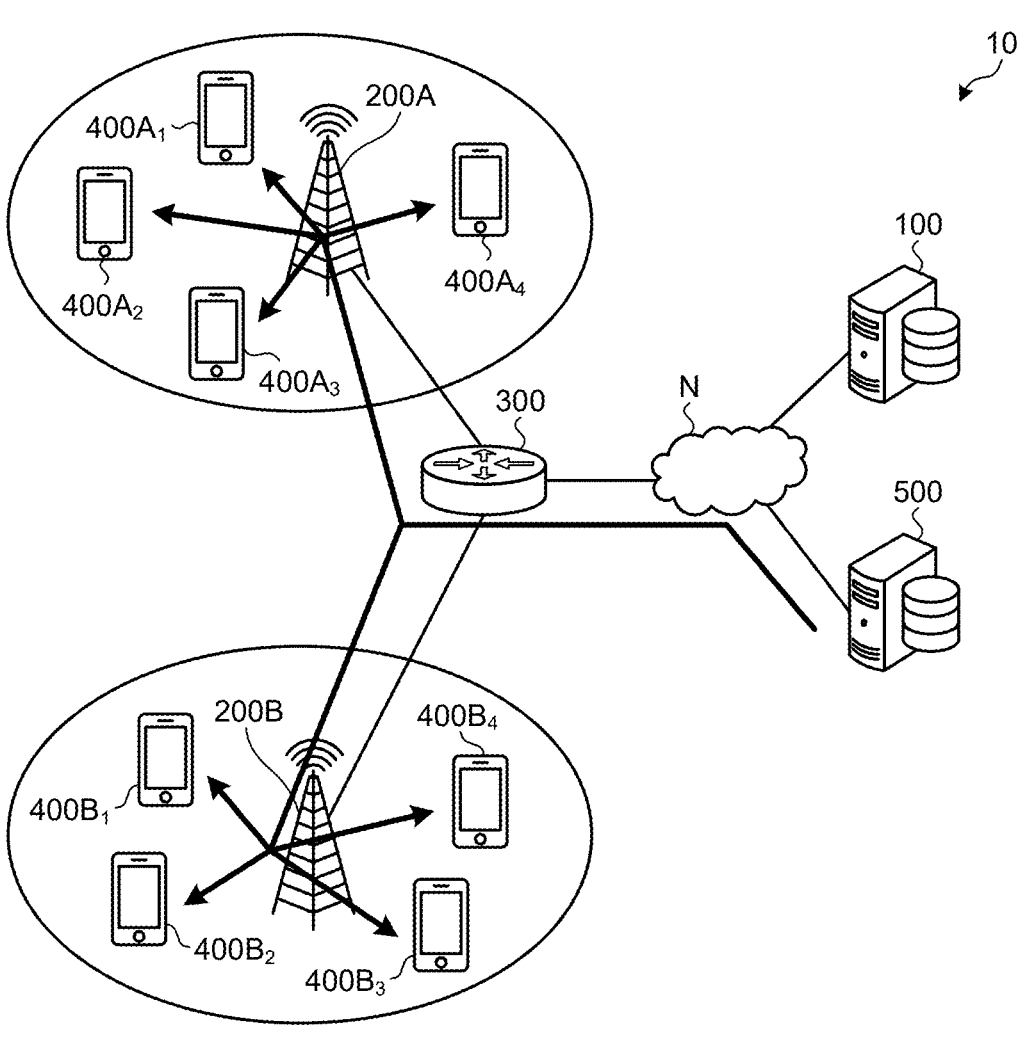
FIG. 2 illustrates communication between a game server and terminal devices according to the embodiment of the present disclosure.
Figure 3:
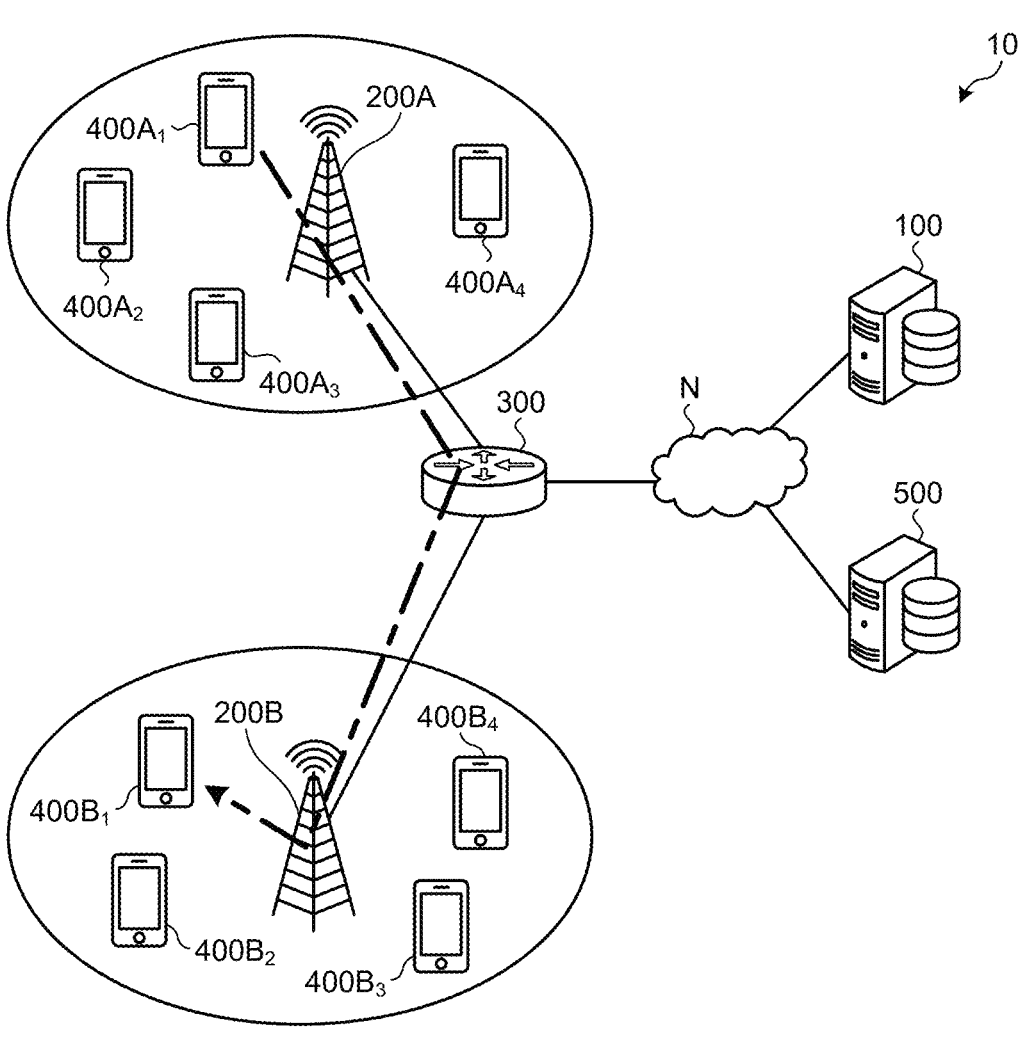
FIG. 3 illustrates communication between the terminal devices according to the embodiment of the present disclosure.

Here, one example of communication performed in the communication system 10 will be described with reference to FIGS. 2 and 3. FIG. 2 illustrates communication between the game server 500 and the terminal devices 400 according to the embodiment of the present disclosure. FIG. 3 illustrates communication between the terminal devices 400 according to the embodiment of the present disclosure.

As illustrated in FIG. 2, the game server 500 transmits information for the terminal devices 400 to execute a game to the terminal devices 400. The game server 500 can simultaneously transmit information having a large communication capacity, such as graphic information, to the terminal devices 400, for example, at the start of a game.

As described above, when the terminal devices 400 receive game service, communication of large-capacity data such as graphic information occurs, and communication of low-capacity data such as command information also occurs. In the communication of large-capacity data which occurs at the start of a game, delay is allowed to some extent. In contrast, in the communication of low-capacity data such as command information which occurs during execution of the game, low delay is demanded.

Thus, as illustrated in FIG. 3, in the communication system 10 according to the embodiment of the present disclosure, low-capacity data generated during execution of the game is directly communicated between the terminal devices 400 without the game server 500. In the example of FIG. 3, the terminal device 400A₁ transmits the generated low-capacity data (e.g., command information) to the terminal device 400B₁ via the base station 200A, the relay station 300, and the base station 200B.

As described above, the communication system 10 can reduce an amount of delay of low-capacity data such as a control command by transmitting and receiving the low-capacity data to and from the terminal devices 400 without the game server 500.

<1.2. Problems>

As described above, however, when players (users of terminal devices 400) play a battle game by using the terminal devices 400 that perform wireless communication such as smartphones, it is desirable for timing of touch of the players to be more accurately reflected in the game. For this purpose, a more stable network with lower delay is demanded as a communication environment for playing a game.

More specifically, for example, a game provided by the game server 500 has a refresh rate of 120 frame per second (fps). In this case, time per frame is approximately 8.33 ms. The terminal device 400 is required to complete touch event processing, communication with a terminal device 400 of an opponent, and drawing processing during approximately 8.33 ms above.

The terminal devices 400 also execute processing other than communication processing, such as touch event processing and drawing processing. Therefore, a period spent for communication processing (hereinafter, also referred to as communication period) is desirably, for example, 1 ms or less. Furthermore, jitter of delay shakes results of delay estimation made by the terminal devices 400, and becomes a factor in deteriorating game user experience (UX).

It has been difficult to achieve communication within one frame as described above by communication via a network such as the Internet (e.g., communication via game server 500). Therefore, a technique has been devised for measuring a delay amount between the terminal devices 400 and compensating for the delay from events (e.g., command information) transmitted from the terminal devices 400. Alternatively, a correction technique has been devised for preventing players from feeling packet arrival fluctuation.

These techniques, however, do not improve packet delay and jitter itself. Therefore, it cannot be said that these techniques solve a root cause of the UX deterioration.

Furthermore, using a wired network is a conceivable method of reducing delay and jitter of a wireless network. In a site of a game tournament as described above, however, a plurality of people meets together. Therefore, laying a wired network under such an environment increases laying costs. Furthermore, physical restrictions such as routing of a wired cable occur. For this reason, not a wired network but a wireless network desirably connects the terminal devices 400 with the base stations 200.

As described above, achieving a network with low delay is desired in a communication network including wireless communication.

In contrast, in the wireless communication, a plurality of terminal devices 400 shares radio waves, so that waiting times until transmission opportunities are given to the terminal devices 400 occur. Furthermore, for example, waiting times at transmission queues of the base stations 200 and the relay station 300 have a large influence on delay requests made in units of microseconds. This point will be described with reference to FIG. 4.

Figure 4:
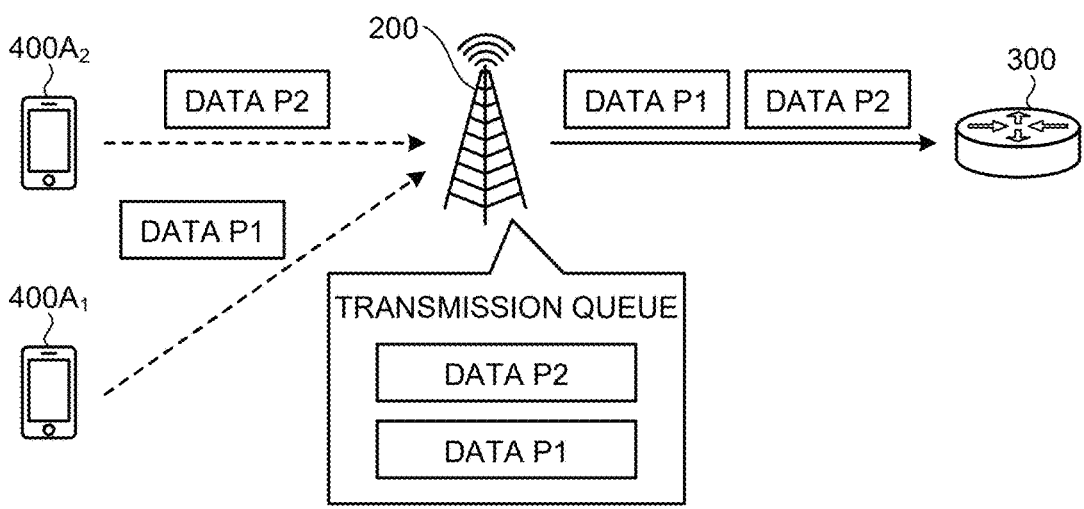
FIG. 4 illustrates one example of communication processing in a base station.

FIG. 4 illustrates one example of communication processing in the base station 200A. In the example of FIG. 4, the base station 200A transmits pieces of data P1 and P2 respectively transmitted by the terminal devices 400A₁ and 400A₂ to the relay station 300.

First, the base station 200A receives the data P2 from the terminal device 400A₂. In this case, the base station 200A stores the data P2 in a transmission queue until obtaining an opportunity of transmitting the data P2.

Next, the base station 200A receives the data P1 from the terminal device 400A1. Furthermore, the transmission queue stores the data P2 that has not yet been transmitted.

In this case, the base station 200A stores the data P1 next to the data P2 in the transmission queue. When obtaining a transmission opportunity, the base station 200A first transmits the data P2 to the relay station 300. After transmitting the data P2, when obtaining the next transmission opportunity, the base station 200A transmits the data P1 to the relay station 300.

As described above, data stored in the transmission queue causes a waiting time until transmission of the data.

For example, in order for the base station 200 to transmit an Ethernet frame having a maximum transmission unit (MTU) of 1500 bytes through an interface of 1 Gbps, a waiting time of at least 1.5 μs is required. Already during processing, in other words, when the transmission queue stores data, the waiting time is further increased.

The base station 200 converts the received wireless data into an Ethernet frame, and transmits the Ethernet frame to the relay station 300. A time (delay time) taken for communication between the terminal devices 400 includes a time that is difficult to reduce, such as a time taken for such data conversion processing and a propagation time of a wired cable connecting the base station 200 and the relay station 300. Therefore, reducing a queue waiting time in which the transmission queue stores data is useful for reducing a time taken for communication between the terminal devices 400.

Examples of a method of reducing the queue waiting time include a method of using priority of a virtual local area network (VLAN). In this method, however, when communication processing has been already performed on data, next data communication processing is not started until the processing on the data ends. Furthermore, when a plurality of pieces of data has the same priority, priority processing is not performed. Communication processing is performed in order of arrival at the base station 200.

As described above, the priority processing of data has a limited effect of reducing the queue waiting time. Therefore, an approach capable of further reducing the transmission queue waiting time is desired.

<1.3. Outline of Proposed Technique>

Thus, in the embodiment of the present disclosure, the control device 100 schedules communications between the terminal devices 400. The control device 100 uses communication paths between the terminal devices 400 connected to different base stations 200 to determine a period during which the terminal devices 400 perform communication for each of the communication paths. The control device 100 notifies the base station 200, the relay station 300, and the terminal device 400 of information on the determined communication periods.

Here, examples of the communication paths include a communication path between the terminal device $400A_1$ connected to the base station 200A and the terminal device $400B_1$ connected to the base station 200B. In this case, the communication paths include a wireless section between the base station 200A and the terminal device $400A_1$, a wired section between the base stations 200A and 200B, and a wireless section between the base station 200B and the terminal device $400B_1$. As described above, the communication paths between the terminal devices 400 include wireless sections and wired sections.

Furthermore, during the communication periods during which the terminal devices 400 perform communication, the base stations 200 perform both wireless communication and wired communication. As described above, the control device 100 brings wireless communication and wired communication together in a communication path as one communication, and allocates the communication periods.

This enables the base station 200, the relay station 300, and the terminal device 400 to execute wireless communication and wired communication within the above-described communication periods, and can reduce the waiting time at the transmission queue. This point will be described with reference to FIG. 5.

Figure 5:
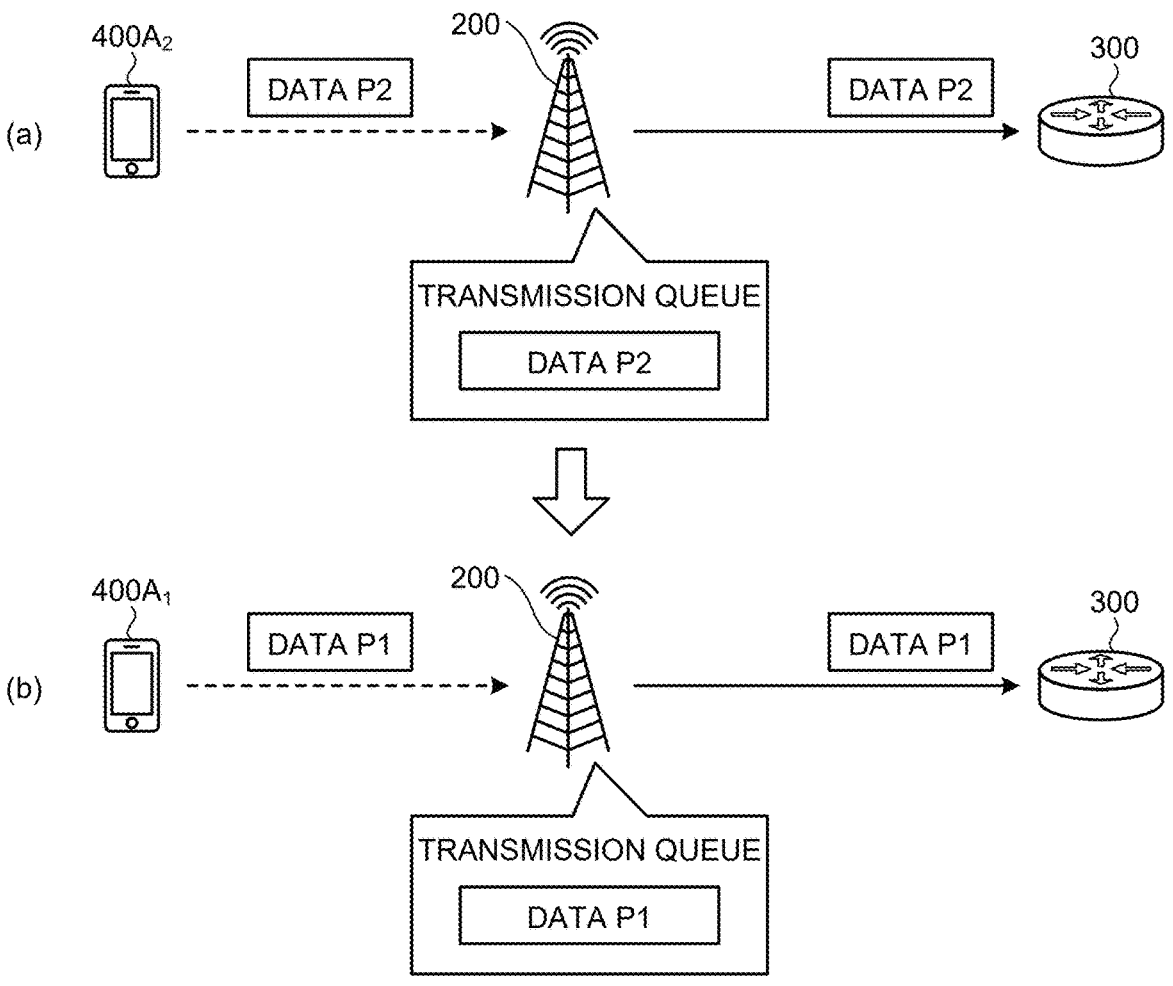
FIG. 5 illustrates one example of communication processing in the base station according to the embodiment of the present disclosure.

FIG. 5 illustrates one example of communication processing in the base station 200A according to the embodiment of the present disclosure. In the example of FIG. 5, the base station 200A transmits pieces of data P1 and P2 respectively transmitted by the terminal devices $400A_1$ and $400A_2$ to the relay station 300.

As described above, the control device 100 determines a communication period for each of a first communication path and a second communication path. The first communication path includes the terminal device $400A_1$. The second communication path includes the terminal device $400A_2$. This causes each of the terminal devices 400 to transmit data to the base station 200A in the determined communication period. Furthermore, the communication period includes a wireless communication period in addition to a wireless communication period. Therefore, the base station that has received each piece of data transmits the data to the relay station 300 in the determined communication period.

More specifically, as illustrated in FIG. 5(*a*), the base station 200 receives the data P2 from the terminal device $400A_2$, and transmits the data P2 to the relay station 300 in a communication period allocated to the second communication path. Therefore, the base station 200 can shorten a waiting time of the data P2 at the transmission queue, or reduce the time to zero.

When the communication period allocated to the second communication path ends, as illustrated in FIG. 5(*b*), the base station 200 receives the data P1 from the terminal device $400A_1$, and transmits the data P1 to the relay station 300 in the communication period allocated to the first communication path. Therefore, the base station 200 can shorten a waiting time of the data P1 at the transmission queue, or reduce the time to zero.

The control device 100 determines a communication period in which wireless communication and wired communication are performed for each communication path, in other words, each terminal device 400, whereby waiting times of data at transmission queues of the base station 200 and the relay station 300 can be further reduced. This enables the communication system 10 to achieve low delay in a communication network including a wireless section and a wired section.

2. Configuration Example of Communication System

<2.1. Configuration Example of Control Device>

Figure 6:
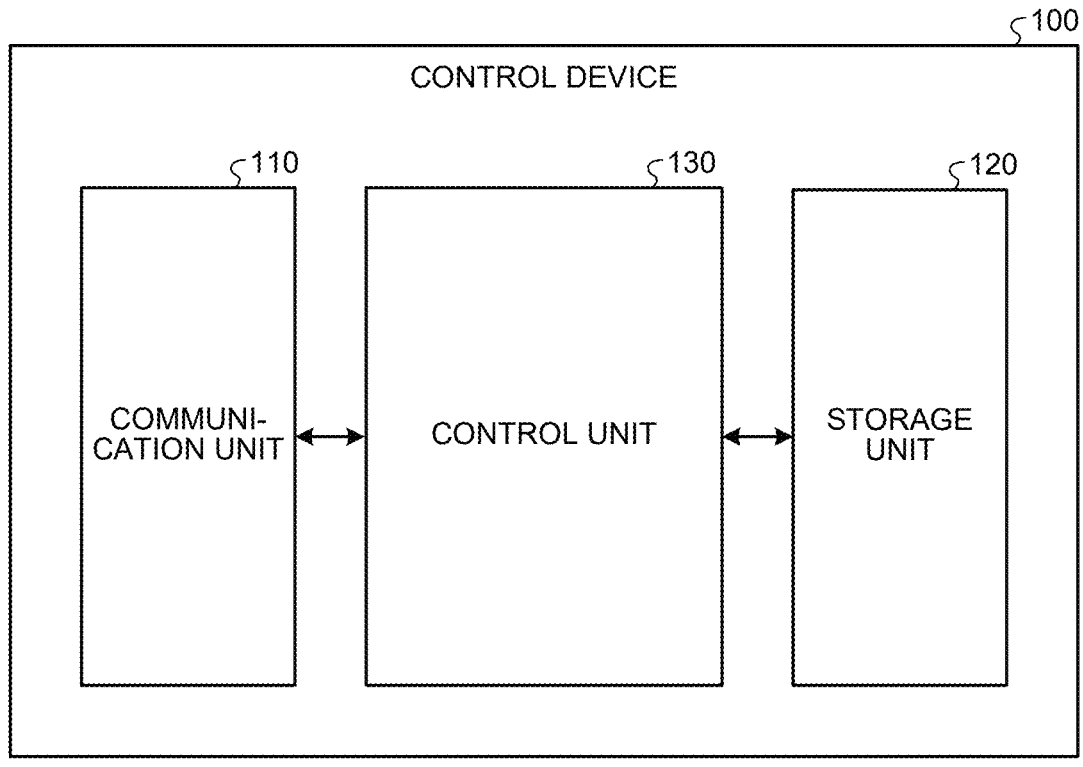
FIG. 6 illustrates a configuration example of a control device according to the embodiment of the present disclosure.

The control device 100 according to the embodiment of the present disclosure is an information processing device that performs scheduling related to communication of the communication system 10. FIG. 6 illustrates a configuration example of the control device 100 according to the embodiment of the present disclosure.

The control device 100 in FIG. 6 includes a network communication unit 110, a storage unit 120, and a control unit 130. Note that FIG. 6 illustrates a functional configuration, and the hardware configuration may be different from the configuration. Furthermore, the functions of the control device 100 may be distributed and implemented in a plurality of physically separated configurations. For example, the control device 100 may include a plurality of server devices.

The network communication unit 110 is a communication interface for communicating with another device. The network communication unit 110 may be a network interface or an equipment-connected interface. For example, the network communication unit 110 may include a local area network (LAN) interface such as a network interface card (NIC), or may include a USB interface including a universal serial bus (USB) host controller, a USB port, and the like. Furthermore, the network communication unit 110 may be a wired interface or a wireless interface. The network communication unit 110 functions as a communication tool of the control device 100.

The storage unit 120 is a data readable/writable storage device such as a dynamic random access memory (DRAM), a static random access memory (SRAM), a flash memory, and a hard disk. The storage unit 120 functions as a storage tool of the control device 100.

The control unit 130 is a controller that controls each unit of the control device 100. For example, the control unit 130 is implemented by a processor such as a central processing unit (CPU) and a micro processing unit (MPU). For example, the control unit 130 is implemented by a processor executing various programs stored in a storage device in the control device 100 by using a random access memory (RAM) or the like as a work area. Note that the control unit 130 may be implemented by an integrated circuit such as an application specific integrated circuit (ASIC) and a field programmable gate array (FPGA). Any of the CPU, the MPU, the ASIC, and the FPGA can be regarded as a controller.

The control unit 130 determines timing when the base stations 200, the relay station 300, and the terminal devices 400 transmit and receive data, and notifies each device of information on the determined timing. Details of the timing determined by the control unit 130 will be described later.

<2.2. Configuration Example of Base Station>

Figure 7:
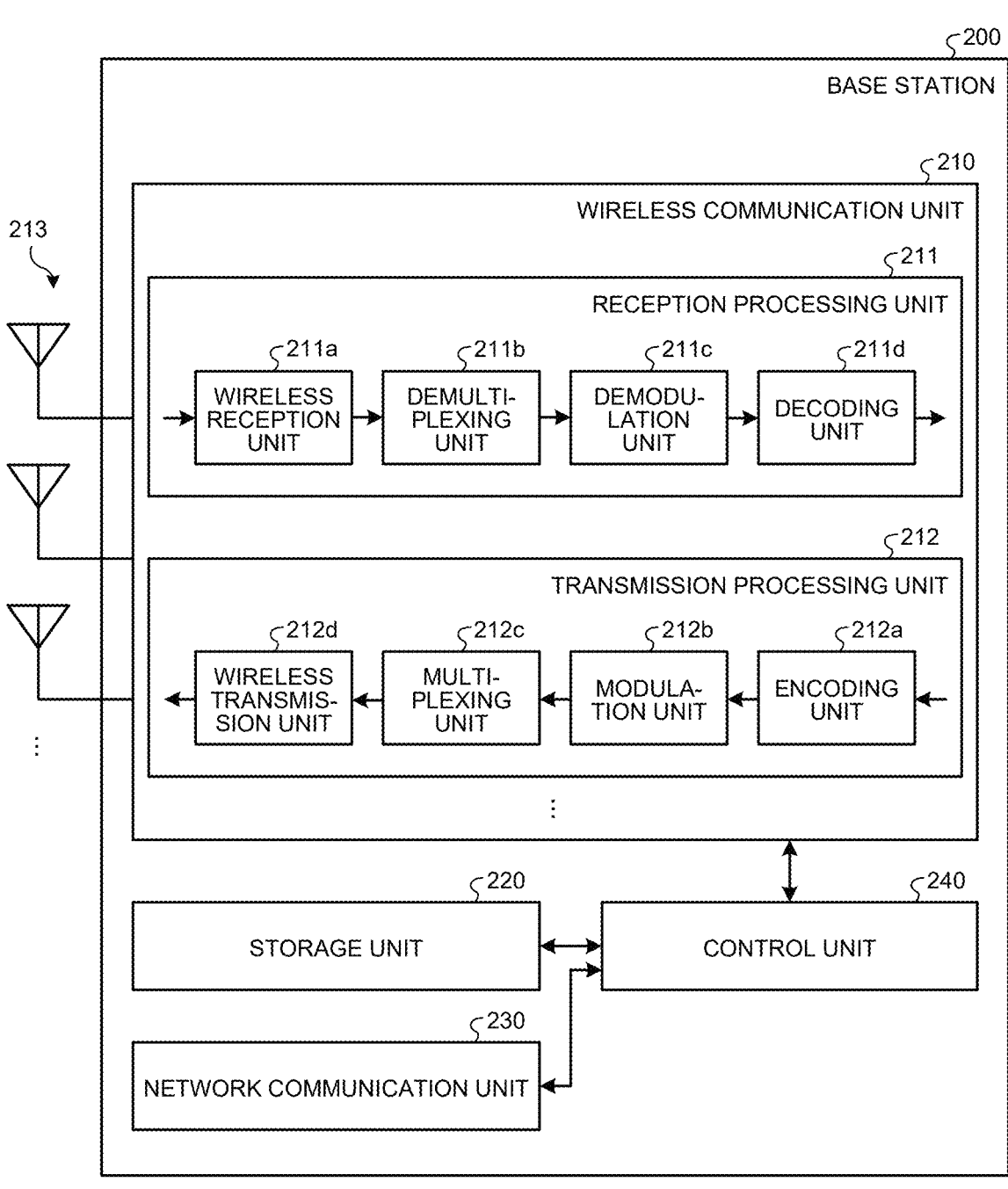
FIG. 7 is a block diagram illustrating a configuration example of a base station according to the embodiment of the present disclosure.

FIG. 7 is a block diagram illustrating a configuration example of a base station 200 according to the embodiment of the present disclosure. The base station 200 includes a wireless communication unit 210, a storage unit 220, a network communication unit 230, and a control unit 240. Note that FIG. 7 illustrates a functional configuration, and the hardware configuration may be different from the configuration. Furthermore, the functions of the base station 200 may be distributed and implemented in a plurality of physically separated configurations.

The wireless communication unit 210 is a wireless communication interface that wirelessly communicates with another wireless communication device (e.g., terminal device 400). The wireless communication unit 210 operates under the control of the control unit 240. Note that the wireless communication unit 210 may support a plurality of wireless access methods. For example, the wireless communication unit 210 may support both NR and LTE. The wireless communication unit 210 may support W-CDMA and cdma2000 in addition to NR or LTE. Definitely, the wireless communication unit 210 may support a wireless access method other than NR, LTE, W-CDMA, and cdma2000.

The wireless communication unit 210 includes a reception processing unit 211, a transmission processing unit 212, and an antenna 213. The wireless communication unit 210 may include a plurality of reception processing units 211, a plurality of transmission processing units 212, and a plurality of antennas 213. Note that, when the wireless communication unit 210 supports a plurality of wireless access methods, each unit of the wireless communication unit 210 can be individually configured for each wireless access method. For example, the reception processing unit 211 and the transmission processing unit 212 may be individually configured by LTE and NR.

The reception processing unit 211 processes an uplink signal received via the antenna 213. The reception processing unit 211 includes a wireless reception unit 211a, a demultiplexing unit 211b, a demodulation unit 211c, and a decoding unit 211d.

The wireless reception unit 211a performs, on the uplink signal, down-conversion, removal of an unnecessary frequency component, control of an amplification level, quadrature demodulation, conversion into a digital signal, removal of a guard interval, extraction of a frequency domain signal through fast Fourier transform, and the like.

The demultiplexing unit 211b separates an uplink channel such as a physical uplink shared channel (PUSCH) and a physical uplink control channel (PUCCH) and an uplink reference signal from signals output from the wireless reception unit 211a. The demodulation unit 211c demodulates a reception signal by using a modulation method such as binary phase shift keying (BPSK) and quadrature phase shift keying (QPSK) for a modulation symbol of the uplink channel. The modulation method used by the demodulation unit 211c may be 16 quadrature amplitude modulation (QAM), 64QAM, or 256QAM. The decoding unit 211d performs decoding processing on a demodulated encoded bit of the uplink channel. Decoded uplink data and uplink control information are output to the control unit 240.

The transmission processing unit 212 performs processing of transmitting downlink control information and downlink data. The transmission processing unit 212 includes an encoding unit 212a, a modulation unit 212b, a multiplexing unit 212c, and a wireless transmission unit 212d.

The encoding unit 212a encodes downlink control information and downlink data input from the control unit 240 by using an encoding method such as block encoding, convolutional encoding, turbo encoding, a low density parity check (LDPC) code, and the like. The modulation unit 212b modulates an encoded bit output from the encoding unit 212a in a predetermined modulation method such as BPSK, QPSK, 16QAM, 64QAM, and 256QAM. The multiplexing unit 212c multiplexes a modulation symbol of each channel and a downlink reference signal, and places the multiplexed modulation symbol and the downlink reference signal to a predetermined resource element. The wireless transmission unit 212d performs various pieces of signal processing on a signal from the multiplexing unit 212c. For example, the wireless transmission unit 212d performs processing such as conversion into a time domain through fast Fourier transform, addition of a guard interval, generation of a baseband digital signal, conversion into an analog signal, quadrature modulation, up-conversion, removal of an extra frequency component, and power amplification. A signal generated by the transmission processing unit 212 is transmitted from the antenna 213.

The storage unit 220 is a data readable/writable storage device such as a DRAM, an SRAM, a flash memory, and a hard disk. The storage unit 220 functions as a storage tool of the base station 200.

The network communication unit 230 is a communication interface for communicating with another device. For example, the network communication unit 230 is a LAN interface such as an NIC. Furthermore, the network communication unit 230 may be a wired interface or a wireless interface. The network communication unit 230 functions as a network communication tool of the base station 200. The network communication unit 230 communicates with another device under the control of the control unit 240. The configuration of the network communication unit 230 may be similar to that of the network communication unit 110 of the control device 100.

The control unit 240 is a controller that controls each unit of the base station 200. For example, the control unit 240 is implemented by a processor such as a central processing unit (CPU) and a micro processing unit (MPU). For example, the control unit 240 is implemented by a processor executing various programs stored in a storage device in the base station 200 by using a random access memory (RAM) or the like as a work area. Note that the control unit 240 may be implemented by an integrated circuit such as an application specific integrated circuit (ASIC) and a field programmable gate array (FPGA). Any of the CPU, the MPU, the ASIC, and the FPGA can be regarded as a controller.

The control unit 240 transmits and receives data at timing about which an instruction has been given by the control device 100. The control unit 240 performs wireless communication with the terminal device 400 by using a parameter acquired from the control device 100. The control unit 240 performs wired communication with the relay station 300 by using a parameter acquired from the control device 100.

<2.3. Configuration Example of Relay Station>

Figure 8:
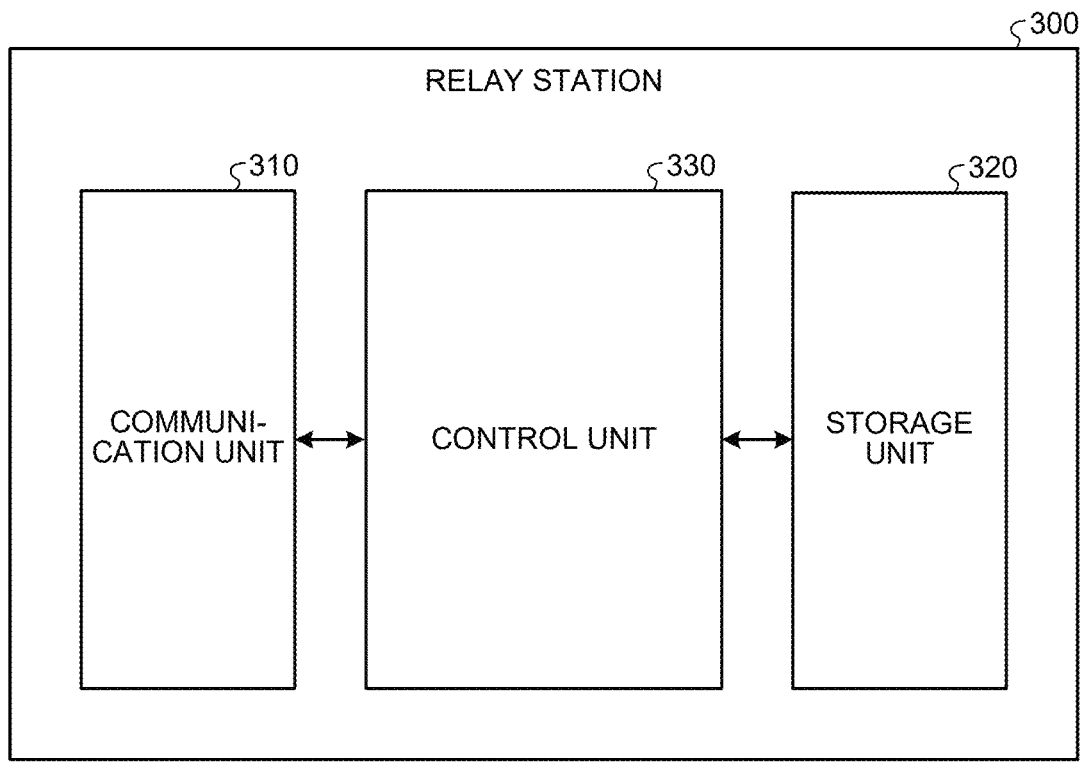
FIG. 8 illustrates a configuration example of a relay station according to the embodiment of the present disclosure.

The relay station 300 is a communication device that relays communication between the base stations 200. FIG. 8 illustrates a configuration example of the relay station 300 according to the embodiment of the present disclosure.

The relay station 300 in FIG. 8 includes a network communication unit 310, a storage unit 320, and a control unit 330. Note that FIG. 8 illustrates a functional configuration, and the hardware configuration may be different from the configuration. Furthermore, the functions of the relay station 300 may be distributed and implemented in a plurality of physically separated configurations. For example, the relay station 300 may include a plurality of server devices.

The network communication unit 310 is a communication interface for communicating with another device. The network communication unit 310 may be a network interface or an equipment-connected interface. For example, the network communication unit 310 may include a local area network (LAN) interface such as a network interface card (NIC), or may include a USB interface including a universal serial bus (USB) host controller, a USB port, and the like. Furthermore, the network communication unit 310 may be a wired interface or a wireless interface. The network communication unit 310 functions as a communication tool of the relay station 300. The configuration of the network communication unit 310 may be similar to that of the network communication unit 110 of the control device 100.

The storage unit 320 is a data readable/writable storage device such as a dynamic random access memory (DRAM), a static random access memory (SRAM), a flash memory, and a hard disk. The storage unit 320 functions as a storage tool of the relay station 300.

The control unit 330 is a controller that controls each unit of the relay station 300. For example, the control unit 330 is implemented by a processor such as a central processing unit (CPU) and a micro processing unit (MPU). For example, the control unit 330 is implemented by a processor executing various programs stored in a storage device in the relay station 300 by using a random access memory (RAM) or the like as a work area. Note that the control unit 330 may be implemented by an integrated circuit such as an application specific integrated circuit (ASIC) and a field programmable gate array (FPGA). Any of the CPU, the MPU, the ASIC, and the FPGA can be regarded as a controller.

The control unit 330 transmits and receives data at timing about which an instruction has been given by the control device 100. The control unit 330 performs wired communication with the base station 200 by using a parameter acquired from the control device 100.

<2.4. Configuration Example of Terminal Device>

Figure 9:
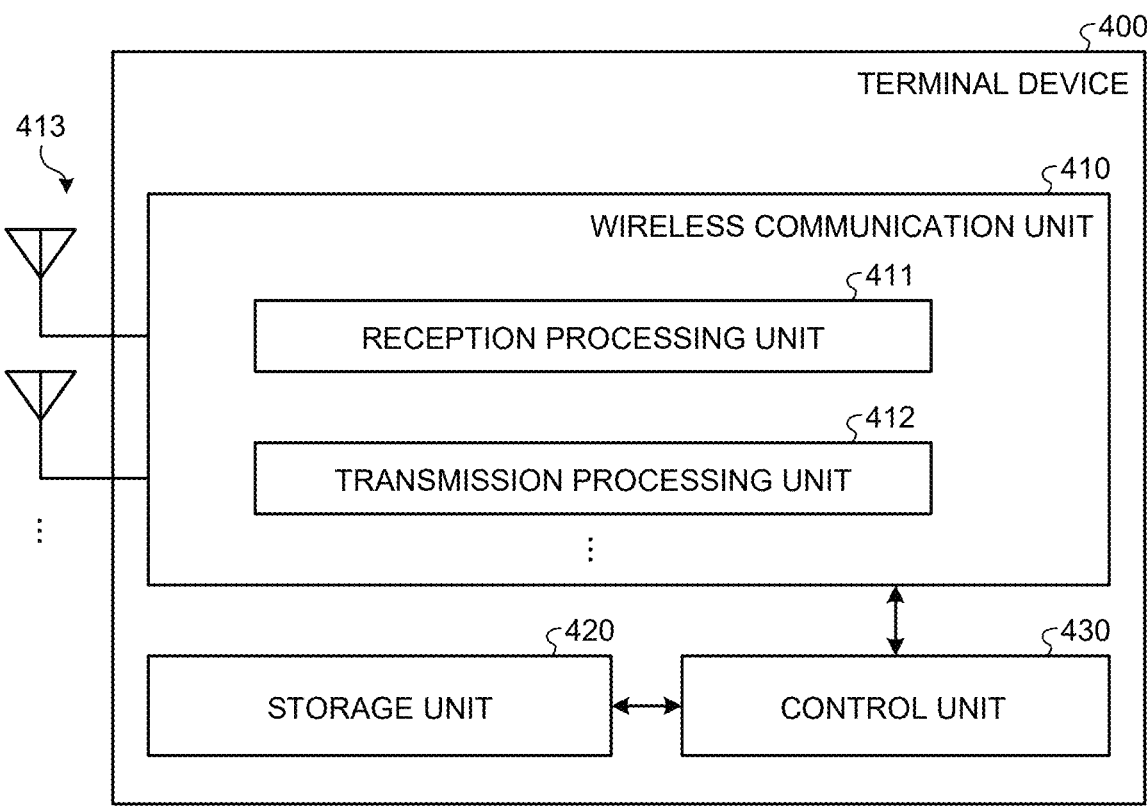
FIG. 9 is a block diagram illustrating a configuration example of a terminal device according to the embodiment of the present disclosure.

FIG. 9 is a block diagram illustrating a configuration example of a terminal device 400 according to the embodiment of the present disclosure. The terminal device 400 includes a wireless communication unit 410, a storage unit 420, and a control unit 430. Note that FIG. 9 illustrates a functional configuration, and the hardware configuration may be different from the configuration. Furthermore, the functions of the terminal device 400 may be distributed and implemented in a plurality of physically separated configurations.

The wireless communication unit 410 is a wireless communication interface that wirelessly communicates with another communication device (e.g., base station 200). The wireless communication unit 410 operates under the control of the control unit 430. The wireless communication unit 410 supports one or a plurality of wireless access methods. For example, the wireless communication unit 410 supports both NR and LTE. The wireless communication unit 410 may support another wireless access method such as W-CDMA and cdma2000.

The wireless communication unit 410 includes a reception processing unit 411, a transmission processing unit 412, and an antenna 413. The wireless communication unit 410 may include a plurality of reception processing units 411, a plurality of transmission processing units 412, and a plurality of antennas 413. Note that, when the wireless communication unit 410 supports a plurality of wireless access methods, each unit of the wireless communication unit 410 can be individually configured for each wireless access method. For example, the reception processing unit 411 and the transmission processing unit 412 may be individually configured by LTE and NR. The reception processing unit 411 and the transmission processing unit 412 have a configuration similar to those of the reception processing unit 211 and the transmission processing unit 212 of the base station 200.

The storage unit 420 is a data readable/writable storage device such as a DRAM, an SRAM, a flash memory, and a hard disk. The storage unit 420 functions as a storage tool of the terminal device 400.

The control unit 430 is a controller that controls each unit of the terminal device 400. For example, the control unit 430 is implemented by a processor such as a central processing unit (CPU) and a micro processing unit (MPU). For example, the control unit 430 is implemented by a processor executing various programs stored in a storage device in the terminal device 400 by using a random access memory (RAM) or the like as a work area. Note that the control unit 430 may be implemented by an integrated circuit such as an application specific integrated circuit (ASIC) and a field programmable gate array (FPGA). Any of the CPU, the MPU, the ASIC, and the FPGA can be regarded as a controller.

The control unit 430 transmits and receives data at timing about which an instruction has been given by the control device 100. The control unit 430 performs wireless communication with the base station 200 by using a parameter acquired from the control device 100.

3. Processing

<3.1. Outline of Each Processing>

Each piece of processing executed in the communication system 10 according to the embodiment of the present disclosure will be outlined below.

[Period Calculation Processing]

As described above, the terminal device 400 is requested to execute signal processing related to a game and processing of communication with another terminal device 400 at a predetermined cycle (e.g., refresh rate).

Thus, first, the terminal device 400 executes period calculation processing of calculating a period to be allocated to communication processing (hereinafter, also referred to as communication allowed period) in the predetermined cycle.

Figure 10:
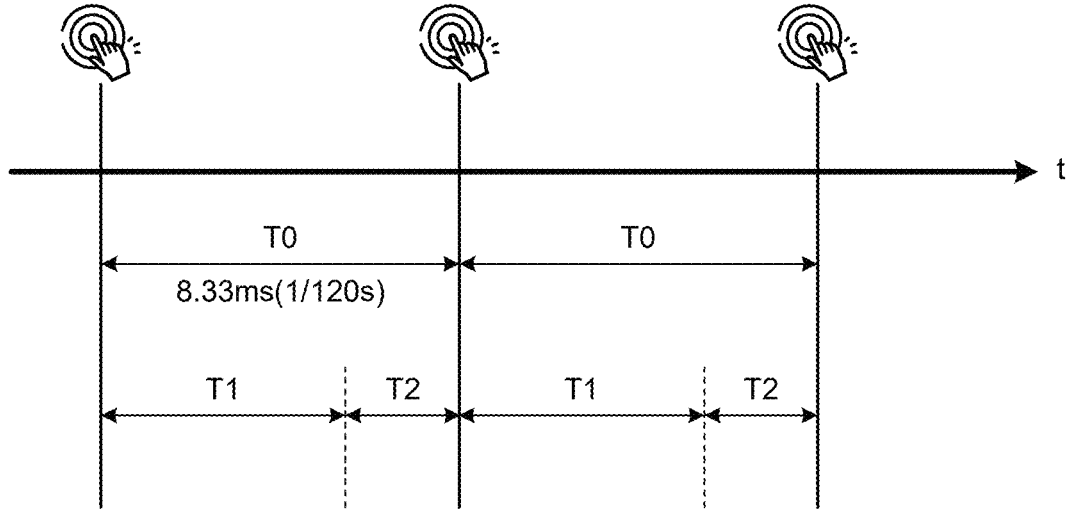
FIG. 10 illustrates a communication allowed period according to the embodiment of the present disclosure.

FIG. 10 illustrates a communication allowed period according to the embodiment of the present disclosure.

The terminal device 400 first calculates a delay time required at the time when an application such as a network battle game is executed. For example, as described above, when a game has a refresh rate of 120 fps, the terminal device 400 completes both communication processing and signal processing including a part of a network battle for each frame. That is, the terminal device 400 executes, for each frame, processing of detecting an input operation performed by a user, such as a tap operation, communicating with another terminal device 400, and drawing the next game image at a cycle of a game processing period T0. In this case, the period T0 of one frame, in other words, a delay time required at the time of execution of the game (corresponding to game processing period T0) is T$0=\frac{1}{120}$ s≈8.33 ms.

The terminal device 400 ends both the signal processing and the communication processing within the game processing period T0. That is, as illustrated in FIG. 10, the game processing period T0 includes an in-application processing period T1 and a communication allowed period T2. In the in-application processing period T1, the signal processing is performed.

The terminal device 400 calculates the communication allowed period T2 from the game processing period T0 and the in-application processing period T1. The terminal device 400 measures a time taken for the signal processing and a time taken for screen update as the in-application processing period T1. The terminal device 400 calculates the game processing period T0 from a refresh rate. The terminal device 400 calculates the communication allowed period T2 by subtracting the in-application processing period T1 from the game processing period T0.

For example, it is assumed that the in-application processing period T1 is 5 ms. In this case, the terminal device 400 calculates T2=8.33−5=3.33 ms as the communication allowed period T2. The period can be used for communicating with another terminal device 400 that is an opponent.

The terminal device 400 notifies the control device 100 of information on the game processing period T0 and the communication allowed period T2.

Note that the signal processing includes input processing and drawing processing. In the input processing, input from a user such as a tap operation is detected. In the drawing processing, a game image is drawn. Furthermore, the communication processing includes transmission processing and reception processing for data. FIG. 10 illustrates a period obtained by adding up periods during which the signal processing such as the input processing and the drawing processing is performed as the in-application processing period T1. Furthermore, FIG. 10 illustrates a period in which the transmission processing and the reception processing for data are performed as the communication allowed period T2.

For example, the terminal device 400 performs the input processing, the communication processing, and then the drawing processing. In this case, the terminal device 400 can notify the control device 100 of information on timing when the communication processing is started in addition to the information on the game processing period T0 and the communication allowed period T2.

[Schedule Determination Processing]

Next, the control device 100 schedules communication so that the terminal device 400 that executes the game ends the communication within the communication allowed period T2 calculated by the terminal device 400.

As described above, the control device 100 determines a communication period including wireless communication and wired communication for each communication path between the terminal devices 400 that perform communication. Here, in the following description, the terminal device 400A$_1$ communicates with the terminal device 400B$_1$. A communication path from the terminal device 400A$_1$ to the terminal device 400B$_1$ is referred to as a first communication path. The first communication path includes an uplink (wireless section) between the terminal device 400A$_1$ and the base station 200A and a wired section between the base station 200A and the relay station 300. Furthermore, the first communication path includes a wired section between the relay station 300 and the base station 200B and a downlink (wireless section) between the base station 200B and the terminal device 400B$_1$ (see FIG. 1).

Furthermore, similarly, the terminal device 400A$_2$ communicates with the terminal device 400B$_2$. A communication path from the terminal device 400A$_2$ to the terminal device 400B$_2$ is referred to as a second communication path. Furthermore, the terminal device 400A$_3$ communicates with the terminal device 400B$_3$. A communication path from the terminal device 400A$_3$ to the terminal device 400B$_3$ is referred to as a third communication path. Furthermore, the terminal device 400A$_4$ communicates with the terminal device 400B$_4$. A communication path from the terminal device 400A$_4$ to the terminal device 400B$_4$ is referred to as a fourth communication path.

Here, in order to simplify the description, a case where data is transmitted from a terminal device 400A to a terminal device 400B will be described.

Note that, here, the communication system 10 can simultaneously perform data transmission from the terminal device 400A to the terminal device 400B and data transmission from the terminal device 400B to the terminal device 400A. In this case, the control device 100 determines that a communication path from the terminal device 400B to the terminal device 400A is different from the above-described first to fourth communication paths. That is, the control device 100 distinguishes a communication path for transmitting data from the terminal device 400A to the terminal device 400B from a communication path for transmitting data from the terminal device 400B to the terminal device 400A, and executes schedule determination processing for each communication path.

Figure 11:
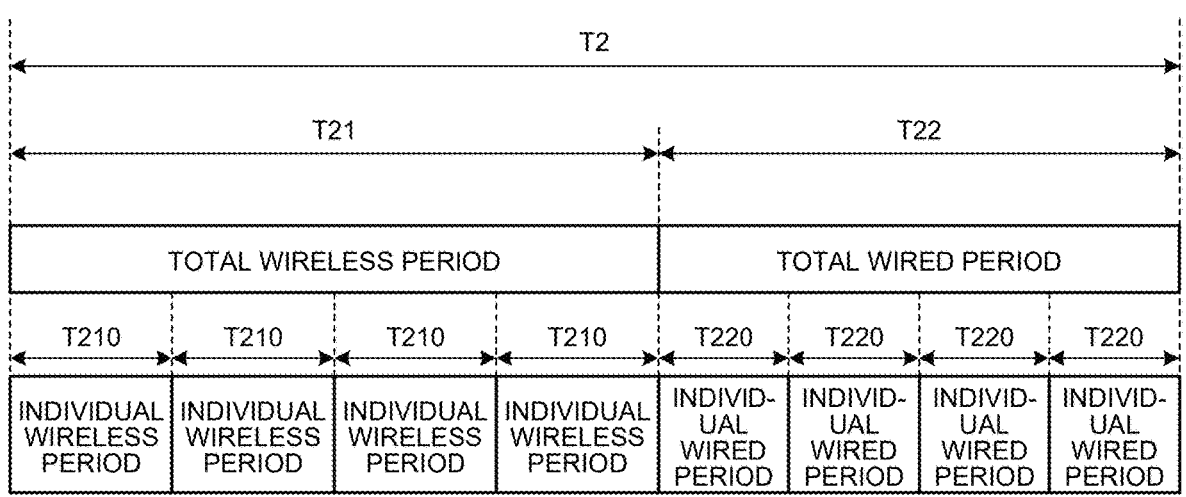
FIG. 11 outlines a communication period according to the embodiment of the present disclosure.
Figure 12:
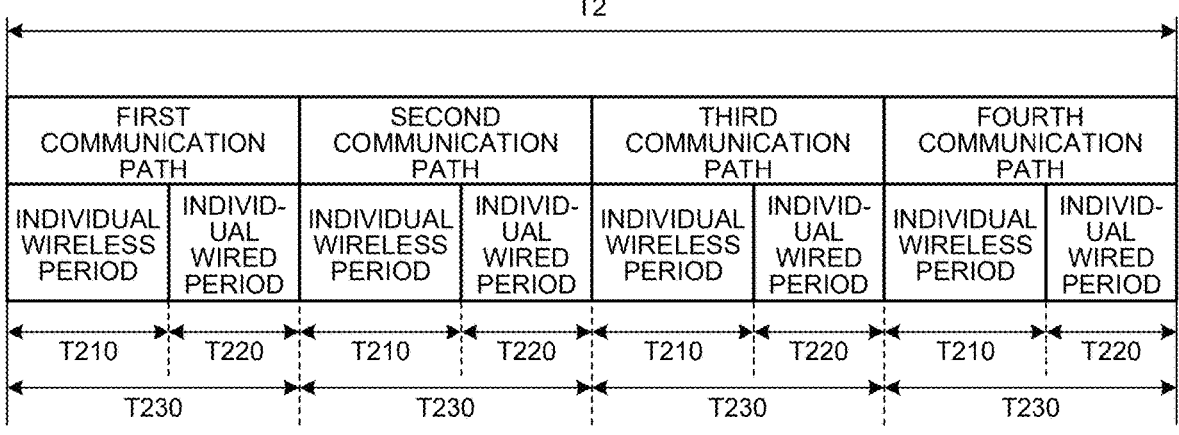
FIG. 12 illustrates one example of a communication period allocated by the control device according to the embodiment of the present disclosure.

First, a communication period determined by the control device 100 will be outlined with reference to FIGS. 11 and 12. FIG. 11 outlines the communication period according to the embodiment of the present disclosure.

As illustrated in FIG. 11, the control device 100 first divides the communication allowed period T2 into a total wireless period T21 and a total wired period T22. In the total wireless period T21, wireless communication is performed. In the total wired period T22, wired communication is performed. The total wireless period T21 is a total of times that can be allocated to wireless communications of a plurality of terminal devices 400 and the base stations 200 in the communication allowed period T2. The total wired period T22 is a total of times that can be allocated to wired communications of the base stations 200A and 200B and the relay station 300 in the communication allowed period T2.

The control device 100 divides the total wireless period T21 by the number of communication paths to calculate an individual wireless period T210, which is a wireless communication time that can be allocated to one communication path. The control device 100 divides the total wired period T22 by the number of communication paths to calculate an individual wired period T220, which is a wired communication time that is to be allocated to one communication path.

In the example of FIG. 11, the control device 100 divides each of the total wireless period T21 and the total wired period T22 by the number (4) of communication paths to calculate the individual wireless period T210 and the individual wired period T220, which can be allocated to one communication path.

The control device 100 allocates the calculated individual wireless period T210 and individual wired period T220 for each communication path as communication periods.

FIG. 12 illustrates one example of a communication period T230 allocated by the control device 100 according to the embodiment of the present disclosure. As illustrated in FIG. 12, the control device 100 allocates the communication period T230 to each of the first to fourth communication paths. The communication period T230 includes the individual wireless period T210 and the individual wired period T220.

The control device 100 determines timing of communication to be performed in each of the communication periods T230 of the first to fourth communication paths. For example, the control device 100 determines a schedule of communication so that data transmitted by the terminal device 400A$_1$ arrives at the terminal device 400B$_1$ within the communication period T230 of the first communication path.

More specifically, the control device 100 determines timing when the terminal device 400A$_1$ transmits data and timing when the base station 200A receives the data and transmits the data to the relay station 300. Furthermore, the control device 100 determines timing when the relay station 300 receives the data and transmits the data to the base station 200B and timing when the terminal device 400B$_1$ receives data.

The control device 100 determines parameters of the wireless communication and the wired communication so that transmission and reception are performed in the determined communication period T230 at the determined timing.

For example, the control device 100 sets identification information for identifying each piece of data as a parameter of the wired communication, for example, for each terminal device 400 that transmits data, in other words, for each communication path.

For example, the control device 100 allocates a VLAN priority to the terminal device 400. The terminal device 400 transmits data to which the allocated VLAN priority is assigned to the terminal device 400, which is a communication partner. This enables the terminal device 400 to occupy a network in a wired section for a period in accordance with the VLAN priority.

Note that up to eight VLAN priorities can be set. Therefore, when the base station 200 accommodates eight terminal devices 400, that is, the control device 100 schedules eight communication paths, the control device 100 can associate the VLAN priorities with the terminal devices 400 (or communication paths) on a one-to-one basis.

In contrast, when the base station 200 accommodates nine or more terminal devices 400, that is, the control device 100 schedules nine or more communication paths, the control device 100 associates a plurality of terminal devices 400 (or plurality of communication paths) with one VLAN priority. In this case, the same VLAN priority is set to a plurality of packets having different addresses. This means that one communication period T230 is set for a plurality of terminal devices 400 (or, plurality of communication paths).

When the same VLAN priority is set to n terminal devices 400, the base station 200 divides the individual wireless period T210 of the communication period T230 allocated to the n terminal devices 400 into 1/n. The base station 200 allocates a time slot of one terminal device 400 to one obtained by dividing the individual wireless period T210 into 1/n.

The control device 100 prevents the terminal devices 400 associated with each VLAN priority from being biased to a specific VLAN priority. For example, when a VLAN priority is allocated to a new terminal device 400, the control device 100 allocates a VLAN priority to which a small number of terminal devices 400 have been allocated to the new terminal device 400.

Furthermore, the control device 100 sets, for example, a subframe length, resource block allocation, and MCS for each terminal device 400 that performs wireless communication as parameters of the wireless communication.

For example, the control device 100 selects a time slot length closest to the length of the individual wireless period T210 among available time slots as a time slot to be used for wireless communication. Alternatively, the control device 100 sets a time slot closest to 1/integer (1/n, n is integer) of the length of the individual wireless period T210 as a time slot to be used for wireless communication.

Note that the control device 100 allocates a time slot to be used in each of uplink wireless communication performed by the terminal device 400A and downlink wireless communication performed by the terminal device 400B. In this case, each time slot is determined such that the total of a time slot length used in the uplink and a time slot length used in the downlink is closest to the length of the individual wireless period T210 or 1/integer of the length of the individual wireless period T210.

The control device 100 allocates the determined time slot to each terminal device 400. The control device 100 allocates a time slot closest to the start timing of the wireless communication among the above-described pieces of timing to the wireless communication.

Note that, although, here, the control device 100 selects a time slot to be used for wireless communication from available time slots, this is not a limitation. The control device 100 may set a time slot in accordance with the length of the individual wireless period T210. When a time slot corresponds to a frequency band, the control device 100 can adjust the length of the time slot by adjusting the frequency band.

In this case, the control device 100 determines a time slot length in accordance with the individual wireless period T210. The control device 100 determines a frequency band that implements the determined time slot length. The control device 100 allocates a time slot in the determined frequency band. This enables the control device 100 to allocate a time slot having a length in accordance with the individual wireless period T210.

As described above, the control device 100 may allocate a time slot in accordance with the individual wireless period T210, that is, a time resource, or may allocate a frequency band in accordance with the individual wireless period T210, that is, a frequency resource.

[Synchronization Processing]

As described above, the control device 100 determines timing of communication performed by the base stations 200, the relay station 300, and the terminal devices 400. In order for the base stations 200, the relay station 300, and the terminal devices 400 to communicate at the timing determined by the control device 100, these devices are required to be time-synchronized.

Figure 13:
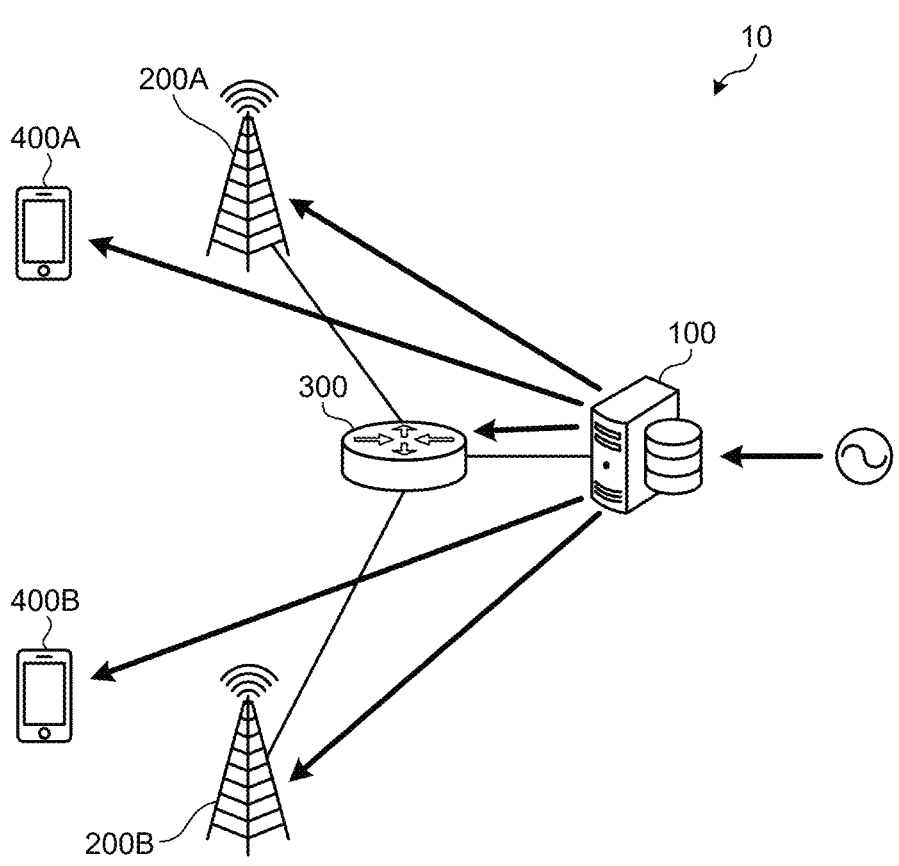
FIG. 13 illustrates time synchronization according to the embodiment of the present disclosure.

FIG. 13 illustrates time synchronization according to the embodiment of the present disclosure. As illustrated in FIG. 13, the control device 100 acquires time from one time source to be time-synchronized with the time source. Examples of the time source include a global positioning system (GPS) and a global navigation satellite system (GNSS). The control device 100 may acquire time from a reliable reference time source other than these time sources.

The control device 100 notifies the base stations 200, the relay station 300, and the terminal devices 400 of the acquired time. This causes the base stations 200, the relay station 300, and the terminal devices 400 to be time-synchronized at one time.

Examples of a time synchronization method include a physical frequency synchronization method using Sync-E or a pulse per second (1PPS) signal. Alternatively, a time synchronization method using a packet such as precision time protocol (PTP) may be used as the time synchronization method.

Note that, although, here, the control device 100 time-synchronizes the base stations 200, the relay station 300, and the terminal devices 400, this is not a limitation. The base stations 200, the relay station 300, and the terminal devices 400 are only required to be time-synchronized, or may be time-synchronized by each device acquiring time from the same time source.

The control device 100 can collectively change set values of the base stations 200, the relay station 300, and the terminal devices 400. For example, the control device 100 inputs set values (e.g., time synchronization and above-described parameters) to a network node via NETCONF. Alternatively, the control device 100 may input the set values in accordance with a software defined networking (SDN) protocol such as openFlow. Note that, when the base stations 200, the relay station 300, and the terminal devices 400 are not distinguished from one another, each device may be referred to as a network node below.

<3.2. Flow of Processing>

<3.2.1. Start Processing>

Figure 14:
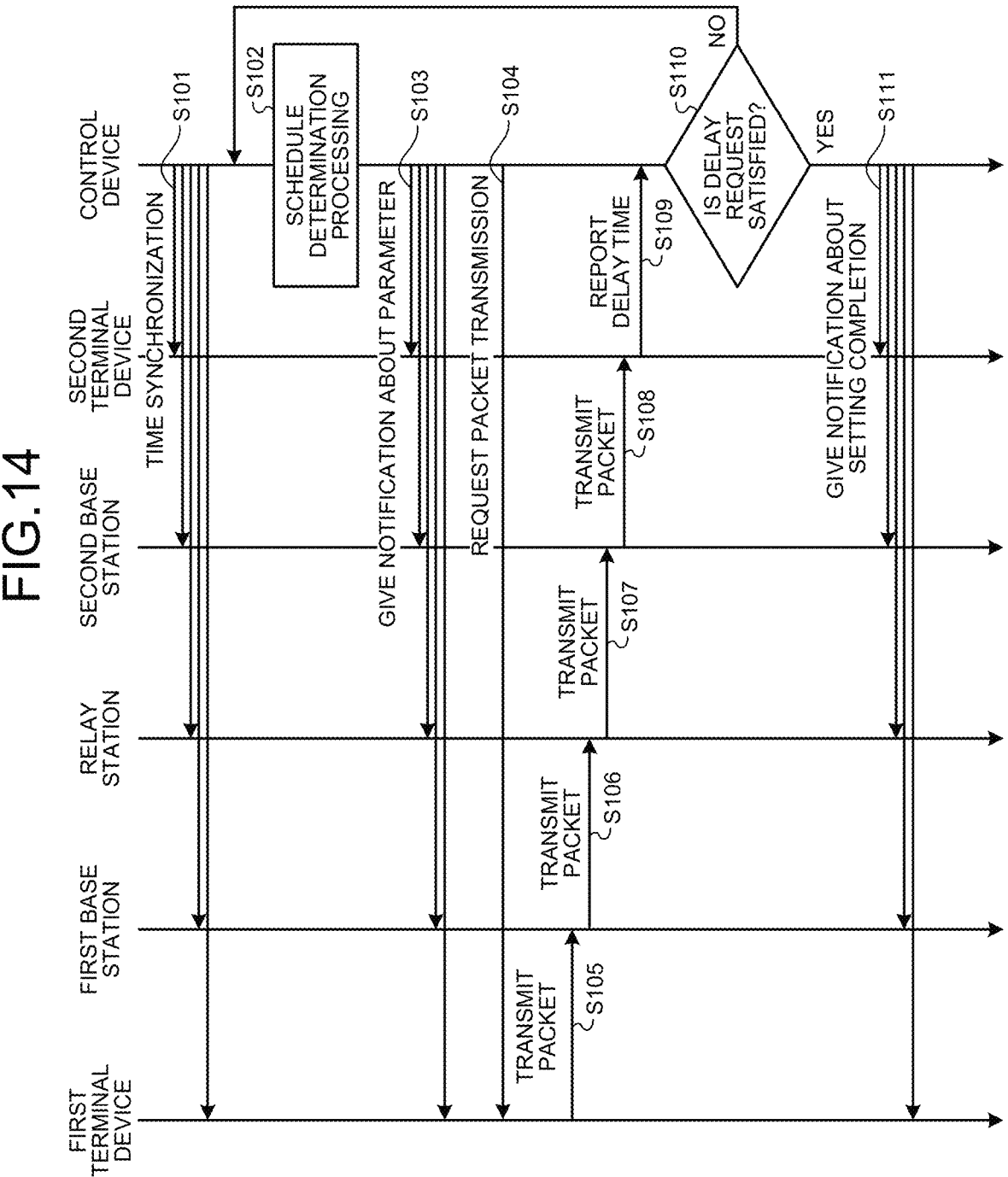
FIG. 14 is a sequence diagram illustrating one example of a flow of start processing according to the embodiment of the present disclosure.

Next, a flow of start processing executed in the communication system 10 will be described with reference to FIGS. 14 and 15. FIG. 14 is a sequence diagram illustrating one example of a flow of start processing according to the embodiment of the present disclosure. The communication start processing in FIG. 14 is executed before service is started in the communication system 10, for example, before a game tournament starts.

Note that, in FIG. 14, in order to distinguish a plurality of terminal devices 400, the terminal device 400A is also referred to as a first terminal device 400A, and the terminal device 400B is also referred to as a second terminal device 400B. Furthermore, similarly, in order to distinguish the base stations 200A and 200B, the base station 200A is also referred to as a first base station 200A, and the base station 200B is also referred to as a second base station 200B.

As illustrated in FIG. 14, the control device 100 performs time synchronization processing, and transmits time synchronization signals to the first and second base stations 200A and 200B, the relay station 300, and the first and second terminal devices 400A and 400B (Step S101). This causes network nodes to be time-synchronized.

Next, the control device 100 executes schedule determination processing (Step S102). Here, one example of a flow of the schedule determination processing will be described with reference to FIG. 15.

Figure 15:
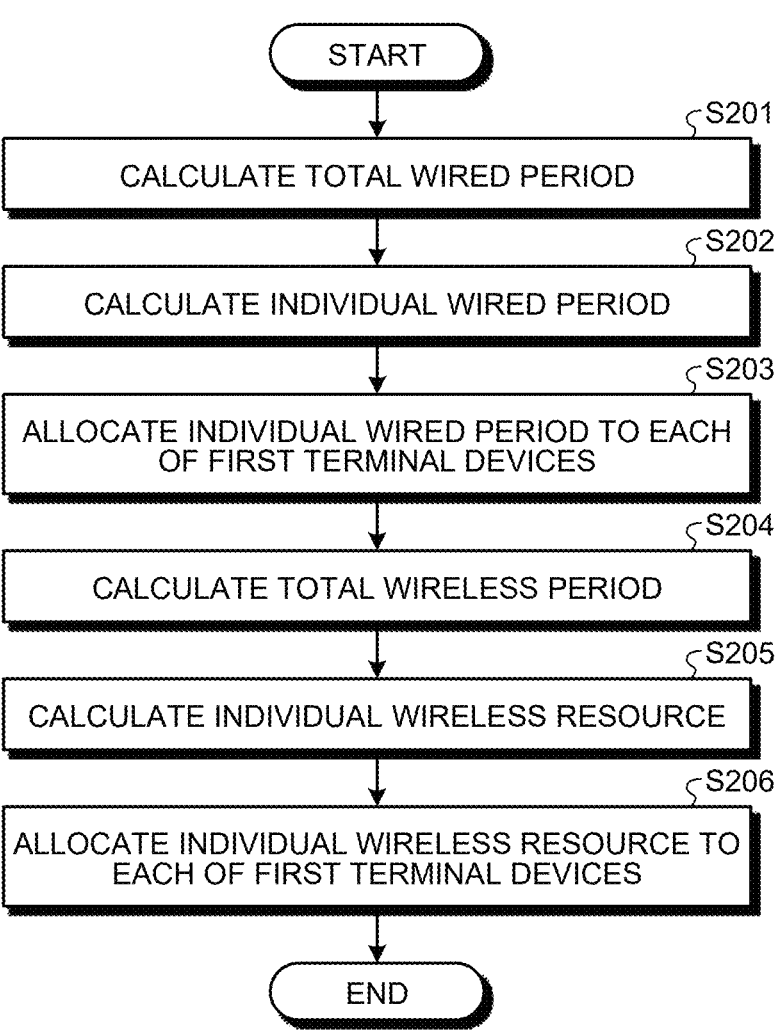
FIG. 15 is a flowchart illustrating one example of a flow of schedule determination processing according to the embodiment of the present disclosure.

FIG. 15 is a flowchart illustrating one example of a flow of schedule determination processing according to the embodiment of the present disclosure.

As illustrated in FIG. 15, the control device 100 first calculates the total wired period T22 (Step S201). The control device 100 acquires, from the first terminal device 400A, information on the communication allowed period T2 obtained by excluding the in-application processing period T1 from one frame. The control device 100 calculates the total wired period T22 by subtracting a period used for wireless communication from the communication allowed period T2.

For example, the control device 100 estimates a time taken for propagation in a wireless section (propagation delay time) from an environment of propagation between the terminal device 400 and the base station 200. Alternatively, the control device 100 may acquire an actually measured propagation delay time from the base station 200 (or terminal device 400).

Furthermore, the control device 100 acquires information on a time taken for processing on wireless signals from the terminal device 400 and the base station 200 (hereinafter, also referred to as wireless calculation period). The wireless calculation period includes a processing time in the wireless communication unit 410 of the terminal device 400 and a processing time in the wireless communication unit 210 of the base station 200. The wireless calculation period may be a predetermined value or a value measured by each of the terminal device 400 and the base station 200.

The control device 100 subtracts the propagation delay time, the wireless calculation period, and the wireless communication period from the communication allowed period T2 to calculate the total wired period T22. Here, the wireless communication period is a time used for wireless communication in the wireless section. The wireless communication period may be a predetermined value or a value designated by an administrator or the like of the communication system 10. The total wired period T22 is the maximum time that can be used for wired communication in a wired section of a communication path.

The control device 100 sets the total wired period T22 as one cycle time in the communication allowed period T2. Note that the total wired period T22 is repeated at a cycle of 120 fps (120 Hz).

The control device 100 divides the total wired period T22 by the number of communication paths included in the communication system 10, and calculates the individual wired period T220 for each communication path (Step S202).

The control device 100 allocates the individual wired period T220 to each of a plurality of first terminal devices 400A (or plurality of communication paths) (Step S203). For example, the control device 100 allocates an occupancy time of a VLAN priority to the calculated individual wired period T220, and allocates an identifier of the VLAN priority to each terminal device 400A (or each communication path).

Next, the control device 100 calculates the total wireless period T21 (Step S204). The control device 100 calculates the total wireless period T21 by subtracting the total wired period T22 from the communication allowed period T2. The total wireless period T21 is the maximum time that can be used for wireless communication in a wireless section of the communication path.

The control device 100 calculates an individual wireless resource (Step S205). For example, the control device 100 divides the total wireless period T21 by the number of a plurality of first terminal devices 400A (or number of plurality of communication paths) to calculate the individual wireless period T210.

The control device 100 subtracts a wireless calculation time in the base station 200 from the individual wireless period T210 to calculate an individual wireless propagation time. The control device 100 calculates at least one of the time resource and the frequency resource in accordance with the individual wireless propagation time as the individual wireless resource.

More specifically, the control device 100 determines at least one of a time slot and a frequency band in accordance with the individual wireless propagation time.

The control device 100 allocates the individual wireless resource calculated for each of the plurality of first terminal devices 400A (Step S206), and ends the processing.

The description will return to FIG. 14. The control device 100 that has executed the schedule determination processing notifies each network node of a parameter related to a determined schedule (Step S103).

For example, the control device 100 notifies the first terminal device 400A to transmit a packet of test data (Step S104). The first terminal device 400A that has received the notification transmits a packet to the first base station 200A (Step S105). Note that the test data includes information on the time when the first terminal device 400A has transmitted the packet (e.g., time stamp).

The first base station 200A that has received the packet transmits the packet to the relay station 300 (Step S106). The relay station 300 that has received the packet transmits the packet to the second base station 200B (Step S107). The second base station 200B that has received the packet transmits the packet to the second terminal device 400B (Step S108).

The second terminal device 400B calculates a time (delay time) until the packet arrives at the second terminal device 400B from the first terminal device 400A from the time when the packet has been received and the time when the packet has been transmitted, and reports the delay time to the control device 100 (Step S109).

The control device 100 determines whether or not a delay request requested by the communication system 10 is satisfied with the set parameter based on the acquired delay time (Step S110).

For example, when the delay time is longer than the communication period T230 obtained by adding up the individual wireless period T210 and the individual wired period T220, the control device 100 determines that the delay request is not satisfied (Step S110; No), and returns to Step S102.

In this case, for example, the control device 100 performs resetting of a parameter, that is, re-scheduling by adjusting a parameter (e.g., individual wireless resource (e.g., sizes of time slot and resource block) and MCS) in wireless communication in the schedule determination processing. For example, the control device 100 adjusts a wireless parameter so that a packet is transmitted within the individual wireless propagation time. Note that, if there is a problem in the number of terminal devices 400 accommodated in a cell of the base station 200, the control device 100 may adjust the accommodation number of the cell by handing over some of the terminal devices 400 to another cell.

In contrast, for example, when the delay time is equal to or less than the communication period T230 obtained by adding up the individual wireless period T210 and the individual wired period T220, the control device 100 determines that the delay request is satisfied (Step S110; Yes).

The control device 100 notifies each network node that the setting of the schedule has been completed (Step S111). Before performing setting completion notification, the control device 100 can transmit, for example, setting information on a parameter (set value) that satisfies the delay request to each network node.

For example, the setting information to be transmitted to the base station 200 includes information on a frequency band and a time slot to be used for each terminal device 400 to be accommodated, that is, information on a wireless resource.

Furthermore, the setting information to be transmitted to the base station 200 includes, for example, information on timing when a packet is transmitted to a wired section and a traffic identifier (e.g., VLAN priority) assigned to the packet.

For example, the setting information to be transmitted to a network node (e.g., relay station 300) of the wired section includes information on a traffic identifier (e.g., VLAN priority) and timing when a packet corresponding to the identifier is transmitted.

Note that, although, here, the control device 100 calculates the individual wired period T220 and then calculates the individual wireless period T210, this is not a limitation. The control device 100 may calculate the individual wireless period T210, and then calculate the individual wired period T220. In this case, the control device 100 subtracts a propagation delay time, a wired calculation period, and a wired communication period from the communication allowed period T2 to calculate the total wireless period T21.

Here, the wired communication period is a time used for wired communication in the wired section. The wired communication period may be a predetermined value or a value designated by an administrator or the like of the communication system 10. The total wireless period T21 is the maximum time that can be used for wireless communication in a wireless section of the communication path.

Furthermore, in this case, the control device 100 calculates the total wired period T22 by subtracting the total wireless period T21 from the communication allowed period T2.

<3.2.2. Communication Processing>

Figure 16:
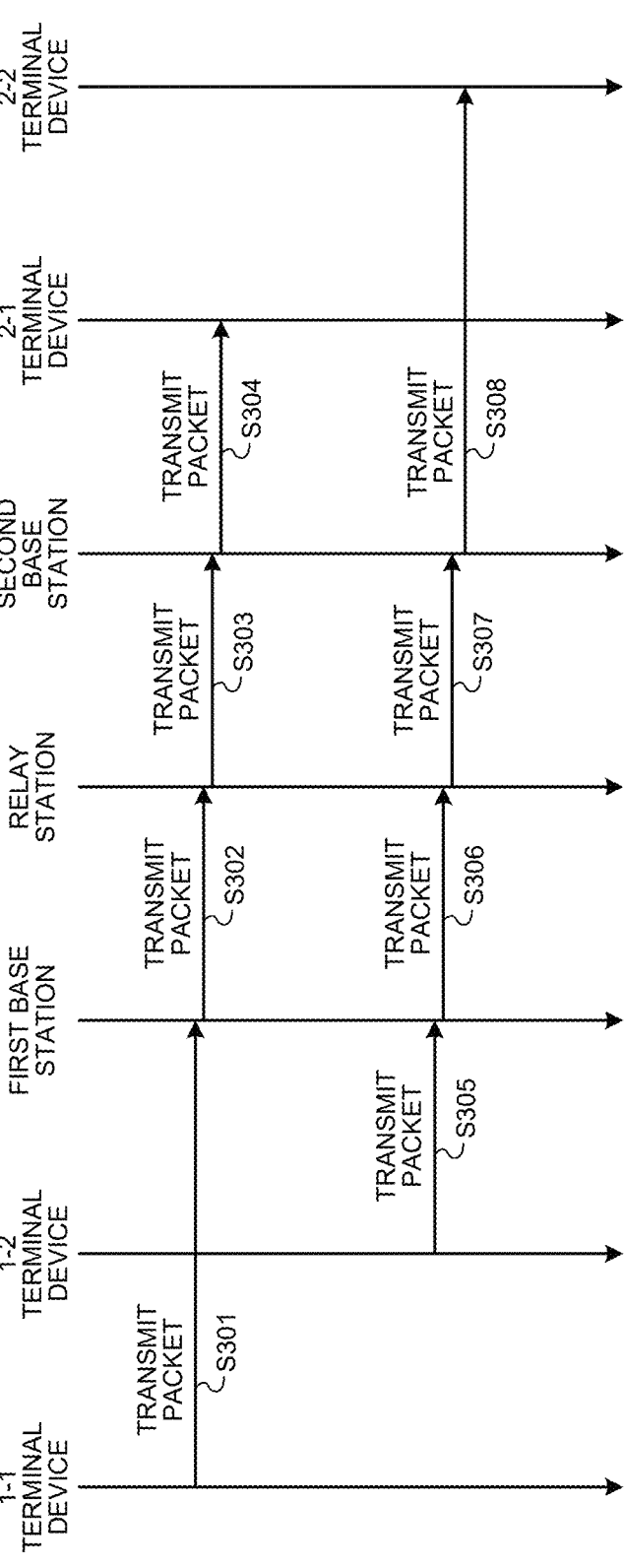
FIG. 16 is a sequence diagram illustrating one example of a flow of communication processing according to the embodiment of the present disclosure.

Next, one example of communication processing in a case where data is actually transmitted from the terminal device 400A to the terminal device 400B will be described with reference to FIG. 16. FIG. 16 is a sequence diagram illustrating one example of a flow of communication processing according to the embodiment of the present disclosure. Note that, in FIG. 16, in order to distinguish the terminal device 400A$_1$ from the terminal device 400A$_2$, the terminal device 400A$_1$ is referred to as a 1-1 terminal device 400A$_1$, and the terminal device 400A$_2$ is referred to as a 1-2 terminal device 400A$_2$. Furthermore, in order to distinguish the terminal device 400B$_1$ from the terminal device 400B$_2$, the terminal device 400B$_1$ is referred to as a 2-1 terminal device 400B$_1$, and the terminal device 400B$_2$ is referred to as a 2-2 terminal device 400B$_2$. Furthermore, here, the control device 100 performs scheduling such that data (packet) is transmitted in order of the 1-1 terminal device 400A$_1$ and the 1-2 terminal device 400A$_2$ in the start processing.

The 1-1 terminal device 400A$_1$ transmits a packet to the first base station 200A (Step S301). The 1-1 terminal device 400A$_1$ transmits the packet at timing about which an instruction has been given by the first base station 200A. The first base station 200A gives an instruction about timing when the 1-1 terminal device $400A_1$ transmits the packet in accordance with the setting information acquired from the control device 100.

The control device 100 has scheduled transmission timing about which an instruction has been given by the first base station 200A so that delay in the first communication path is minimized. Therefore, the packet transmitted by the 1-1 terminal device 400A at the timing is transferred to the relay station 300 at timing with low delay in next Step S302.

The first base station 200A that has received the packet at the timing about which an instruction has been given from the control device 100 converts a wireless packet into a wired packet, and transmits the packet to the relay station 300 at the timing about which an instruction has been given from the control device 100 (Step S302). At this time, the first base station 200A generates a wired packet to which a traffic identifier (e.g., VLAN priority) has been assigned.

The relay station 300 that has received the packet at the timing about which an instruction has been given from the control device 100 transmits the packet to the second base station 200B at the timing about which an instruction has been given from the control device 100 in accordance with the traffic identifier assigned to the packet (Step S303).

The second base station 200B that has received the packet at the timing about which an instruction has been given from the control device 100 converts the wired packet into a wireless packet, and transmits the packet to the 2-1 terminal device $400B_1$ at the timing about which an instruction has been given from the control device 100 (Step S304).

The 2-1 terminal device $400B_1$ transmits the packet at timing about which an instruction has been given by the second base station 200B. The second base station 200B gives an instruction about timing when the 2-1 terminal device $400B_1$ receives the packet in accordance with the setting information acquired from the control device 100.

When the packet transmitted by the 1-1 terminal device $400A_1$ arrives at the 2-1 terminal device $400B_1$, the 1-2 terminal device $400A_2$ transmits the packet to the first base station 200A (Step S305). The 1-2 terminal device $400A_2$ transmits the packet at timing about which an instruction has been given by the first base station 200A. The first base station 200A gives an information about timing when the 1-2 terminal device $400A_2$ transmits the packet in accordance with the setting information acquired from the control device 100.

The control device 100 has scheduled transmission timing about which an instruction has been given by the first base station 200A so that delay in the first communication path is minimized. Therefore, the packet transmitted by the 1-2 terminal device $400A_2$ at the timing is transferred to the relay station 300 at timing with low delay in next Step S306.

The first base station 200A that has received the packet at the timing about which an instruction has been given by the control device 100 converts a wireless packet into a wired packet, and transmits the packet to the relay station 300 at the timing about which an instruction has been given by the control device 100 (Step S306). At this time, the first base station 200A generates a wired packet to which a traffic identifier (e.g., VLAN priority) has been assigned.

The relay station 300 that has received the packet at the timing about which an instruction has been given from the control device 100 transmits the packet to the second base station 200B at the timing about which an instruction has been given from the control device 100 in accordance with the traffic identifier assigned to the packet (Step S307).

The second base station 200B that has received the packet at the timing about which an instruction has been given from the control device 100 transmits the packet to the 2-2 terminal device $400B_2$ at the timing about which an instruction has been given from the control device 100 (Step S308). The 2-2 terminal device $400B_2$ receives the packet at timing about which an instruction has been given by the second base station 200B. The second base station 200B gives an instruction about timing when the 2-2 terminal device $400B_2$ receives the packet in accordance with the setting information acquired from the control device 100.

As described above, each network node transmits and receives a packet at timing about which an instruction has been given by the control device 100, so that each network node can transmit the received packet to the next network node with low delay each time the packet is received. This reduces a time during which a packet waits in a transmission queue of each network node. The packet is transmitted to the next network node with low delay. Therefore, each network node can reduce a waiting time in the transmission queue. This enables the communication system 10 to achieve further low delay in a communication network including a wireless section and a wired section.

Note that, although, here, the first terminal device 400A transmits a packet with low delay by using a communication path, this is not a limitation. The first terminal device 400A can switch a path for transmitting a packet in accordance with the type of the packet to be transmitted.

For example, the first terminal device 400A transmits a low-delay packet that is sensitive to delay, that is, that needs low delay (e.g., packet related to operation command of communication battle) by using the above-described communication path with low delay (see FIG. 3). That is, the first terminal device 400A transmits the low-delay packet by using a wireless resource designated by the first base station 200A at timing designated by the first base station 200A.

In contrast, a flow for which low delay is not required (e.g., large-capacity packet associated with graphics of game) is transmitted by using a communication path different from the above-described communication path with low delay. For example, the first terminal device 400A exchanges the large-capacity packet with the game server 500 by using a communication path via the network N (see FIG. 2).

For example, the first terminal device 400A distinguishes a flow of a low-delay packet from a flow of a large-capacity packet by using a port number, for example. For example, the first terminal device 400A sets a port number used for the flow of low delay different from a port number used for the flow of large capacity. As described above, the first terminal device 400A distinguishes traffic for low delay from traffic for large capacity in which throughput is emphasized.

4. Variation

In the above-described embodiment, the control device 100 determines timing when the terminal device $400A_1$ transmits data and timing when the first base station 200A receives the data and transmits the data to the relay station 300. Furthermore, the control device 100 determines timing when the relay station 300 receives the data and transmits the data to the second base station 200B and timing when the terminal device $400B_1$ receives the data.

In the above-described embodiment, timing when a network node (e.g., first base station 200A) transmits data is the same as timing when an adjacent network node (e.g., relay station 300) receives the data. The timing when the adjacent network node receives the data is, however, not limited thereto.

Figure 17:
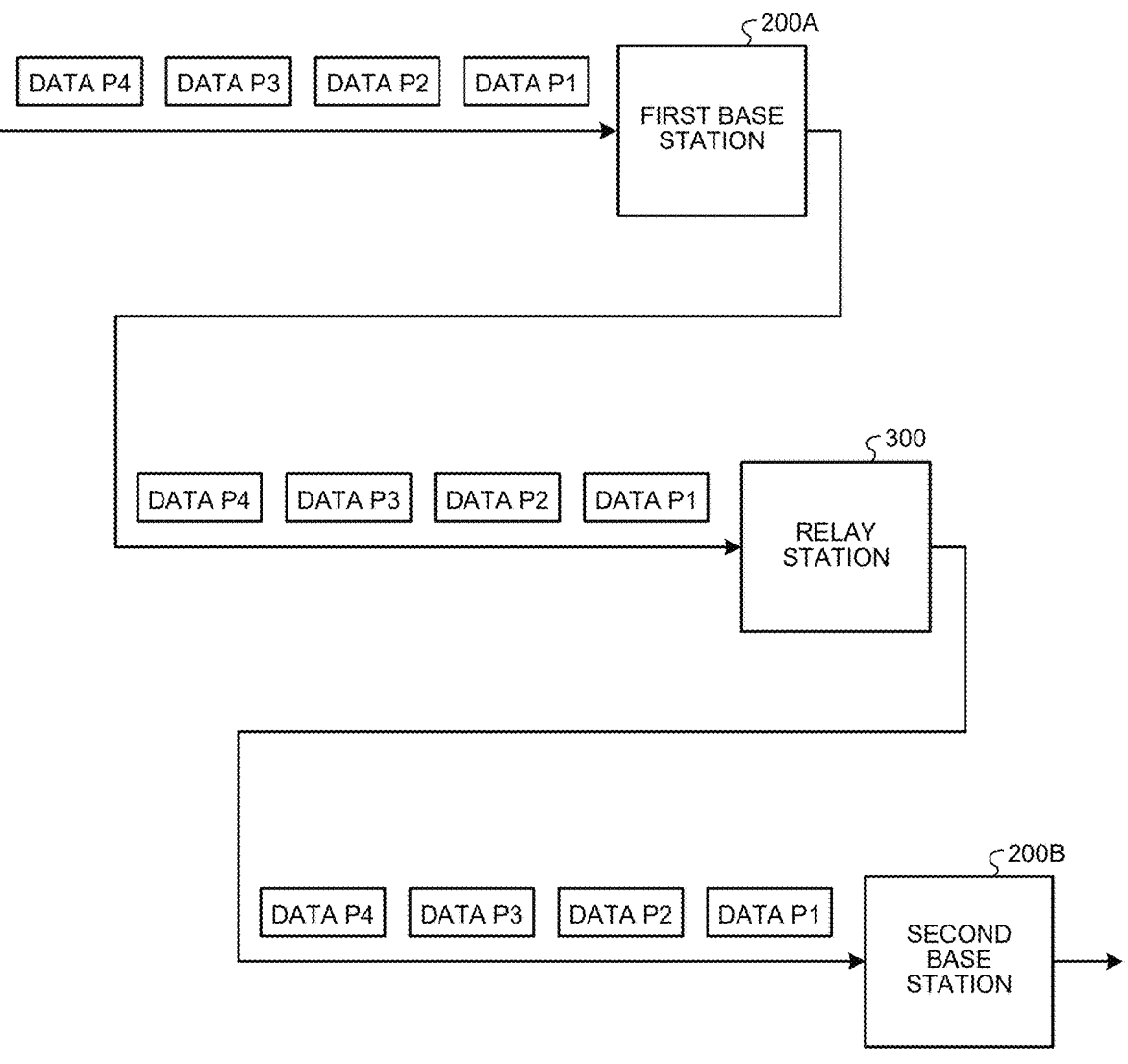
FIG. 17 illustrates one example of a flow of data according to a variation of the embodiment of the present disclosure.

FIG. 17 illustrates one example of a flow of data according to a variation of the embodiment of the present disclosure. As illustrated in FIG. 17, the first base station 200A sequentially receives pieces of data P1, P2, P3, and P4. Note that the data P1 is packet data transmitted by the terminal device 400A₁. The data P2 is packet data transmitted by the terminal device 400A₂. The data P3 is packet data transmitted by the terminal device 400A₃. The data P4 is packet data transmitted by the terminal device 400A₄.

The first base station 200A sequentially transmits the received pieces of data P1 to P4 to an adjacent network node (relay station 300). The relay station 300 sequentially receives the pieces of data P1, P2, P3, and P4 from the first base station 200A. The relay station 300 sequentially transmits the received pieces of data P1 to P4 to an adjacent network node (second base station 200B). The second base station 200B sequentially receives the pieces of data P1, P2, P3, and P4 from the relay station 300.

Figure 18:
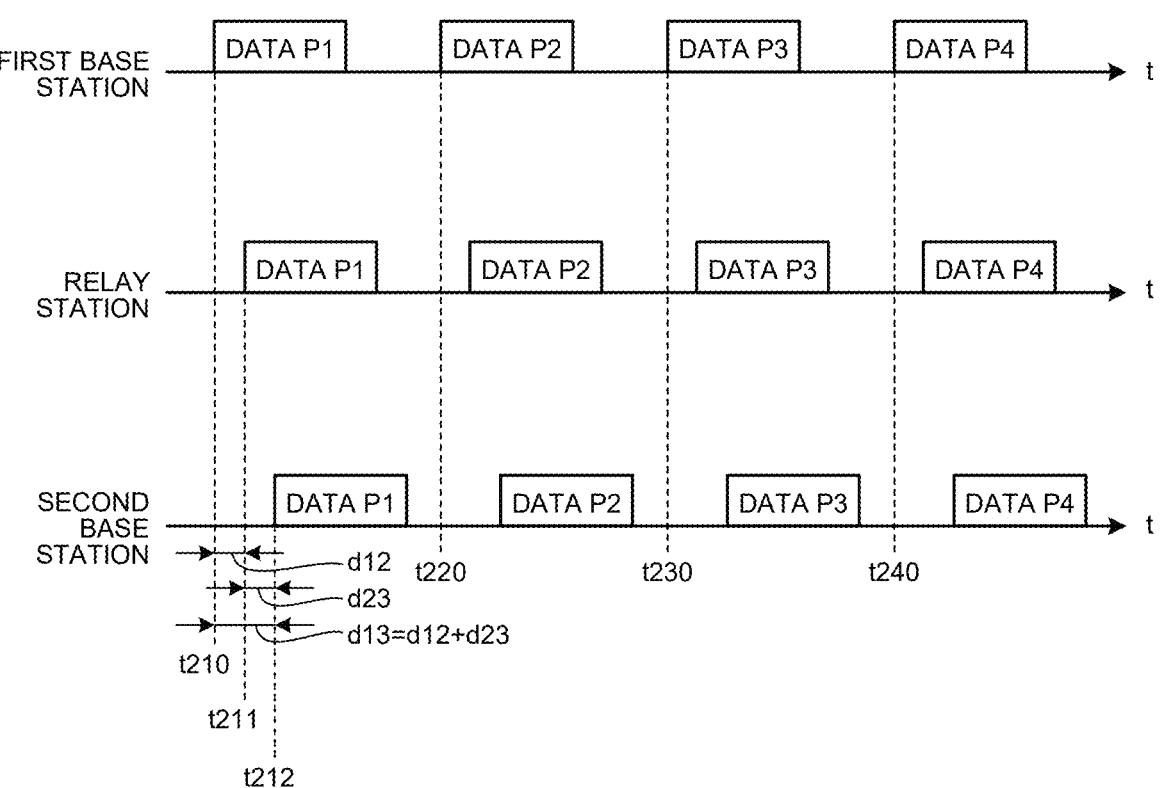
FIG. 18 illustrates one example of timing of transmission and reception of data according to the variation of the embodiment of the present disclosure.

Next, timing when the network nodes transmit and receive data will be described in detail with reference to FIG. 18. FIG. 18 illustrates one example of timing of transmission and reception of data according to the variation of the embodiment of the present disclosure.

The first base station 200A, which has received the data P1 from the terminal device 400A₁, acquires a right to transmit the data P1 at time t210, and transmits the data P1 in accordance with an instruction from the control device 100.

The first base station 200A loses the right to transmit the data P1 at time t220, and acquires a right to transmit the next data P2. The first base station 200A transmits the data P2 at the time t220. Similarly, the first base station 200A loses the right to transmit the data P2 at time t230, and acquires a right to transmit the next data P3. The first base station 200A transmits the data P3 at the time t230. The first base station 200A loses the right to transmit the data P3 at time t240, and acquires a right to transmit the next data P4. The first base station 200A transmits the data P4 at the time t240.

Furthermore, the relay station 300 and the second base station 200B receive and transmit the data P1 during the period from when the right to transmit the data P1 is acquired at the time t210 to when the transmission right is lost at the time t220 in accordance with an instruction from the control device 100. Similarly, the relay station 300 and the second base station 200B receive and transmit the data P2 during the period from when the right to transmit the data P2 is acquired at the time t220 to when the transmission right is lost at the time t230. The relay station 300 and the second base station 200B receive and transmit the data P3 during the period from when the right to transmit the data P3 is acquired at the time t230 to when the transmission right is lost at the time t240. The relay station 300 and the second base station 200B receive and transmit the data P4 during the period from when the right to transmit the data P4 is acquired at the time t240 to when the transmission right is lost next.

As described above, the network nodes transmit and receive data during a period of a transmission opportunity (corresponding to individual wired period T220) about which an instruction has been given by the control device 100. The network nodes acquire a transmission right for a predetermined terminal device 400 at a predetermined cycle (e.g., refresh rate), for example.

Here, even between network nodes in a wired section, propagation delay occurs although the propagation delay is smaller than that in a wireless section.

As illustrated in FIG. 18, for example, propagation delay of d12 occurs between the first base station 200A and the relay station 300. Therefore, the data P1 transmitted by the first base station 200A at time t210 arrives at the relay station 300 at time t211, which is delayed by d12.

Propagation delay of d23 occurs between the relay station 300 and the second base station 200B. Therefore, the data P1 transmitted by the relay station 300 at the time t211 arrives at the second base station 200B at time t212, which is delayed by d23. In other words, the data P1 transmitted from the first base station 200A at the time t210 arrives at the second base station 200B at the time t212, which is delayed by d13=d12+d23.

As described above, even in a wired section, data transmitted from a network node reaches the next network node with delay corresponding to propagation delay.

Thus, in the variation, the control device 100 determines timing when a transmission right is acquired in accordance with propagation delay of a wired section. That is, the control device 100 determines timing when wired communication starts in a communication period, that is, timing when the individual wired period T220 starts in accordance with the propagation delay of the wired section.

In the example of FIG. 18, the control device 100 sets timing when the relay station 300 acquires a transmission right to be shifted by d12 from timing when the first base station 200A acquires a transmission right. For example, the control device 100 sets the relay station 300 to acquire the right to transmit the data P1 at the time t211, which is delayed from the time t210 by d12.

The control device 100 sets timing when the second base station 200B acquires a transmission right to be shifted by d13 from timing when the first base station 200A acquires a transmission right. For example, the control device 100 sets the second base station 200B to acquire the right to transmit the data P1 at the time t212, which is delayed from the time t210 by d13.

Figure 19:
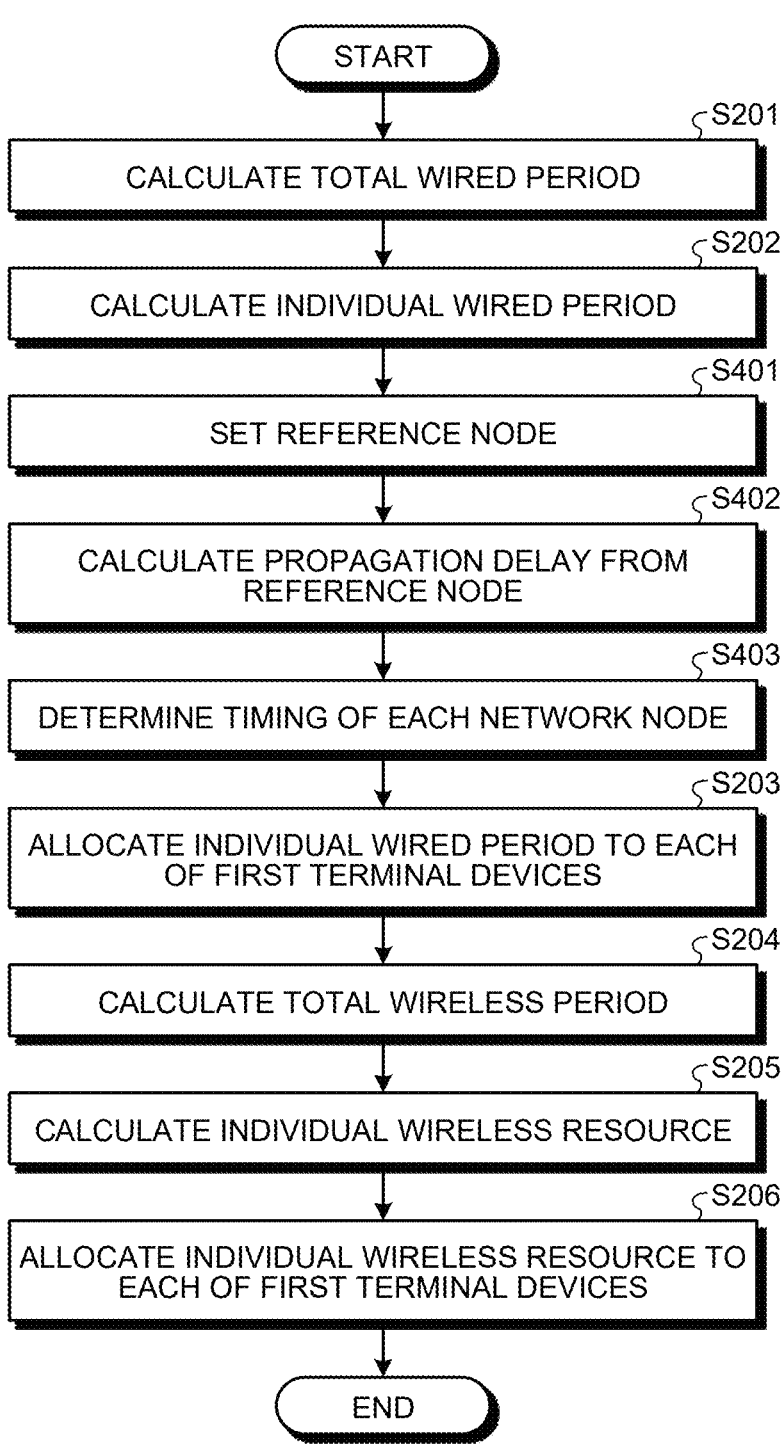
FIG. 19 is a flowchart illustrating one example of schedule determination processing according to the variation of the embodiment of the present disclosure.

FIG. 19 is a flowchart illustrating one example of schedule determination processing according to the variation of the embodiment of the present disclosure. In the schedule determination processing in FIG. 19, the same reference signs are attached to the same pieces of processing as those in FIG. 15, and the description thereof will be omitted.

In Step S202, the control device 100 calculates the individual wired period T220. Next, the control device 100 sets a network node (hereinafter, also referred to as reference node) serving as a reference for propagation delay calculation (Step S401). For example, the control device 100 determines the first base station 200A as a reference node.

The control device 100 calculates propagation delay from the reference node for each network node included in a communication path (Step S402). The control device 100 may calculate the propagation delay on the assumption that delay times between the adjacent network nodes have a constant value, or may actually measure the delay time between the network nodes to calculate the propagation delay.

For example, when the delay time between the adjacent network nodes has a constant value, the control device 100 calculates how many hops the network node for which the propagation delay is to be calculated is away from the reference node. The control device 100 calculates the propagation delay between the network nodes by multiplying a delay time by the calculated number of hops.

For example, it is assumed that the control device 100 calculates propagation delay of the second base station 200B. The second base station 200B is two hops away from the reference node. Furthermore, it is assumed that the control device 100 calculates propagation delay with a delay time (d12 and d23) between adjacent network nodes set as 10 μs. In this case, the control device 100 calculates the propagation delay d13 of the second base station 200B as 10 μs×2=20 μs.

For example, when measuring the delay time between the network nodes, the control device 100 acquires a round-trip delay time between the network nodes by using Packet Internet Groper (ping). The control device 100 calculates the propagation delay of the network node by dividing the acquired round-trip delay time by "2".

Next, the control device 100 determines timing (timing when transmission right is acquired) of each network node based on the calculated propagation delay (Step S403). For example, the control device 100 sets the timing when each network node acquires a transmission right to be delayed from the reference node by the propagation delay. For example, the control device 100 sets timing when the second base station 200B acquires a transmission right to be delayed by d13 from timing when the first base station 200A serving as a reference node acquires a transmission right.

This enables each network node to acquire a transmission right at timing in accordance with the propagation delay.

Note that, when reception timing of a network node (e.g., second terminal device 400B) in a wireless section is set, the control device 100 can calculate a time required for signal processing of conversion from a wired packet into a wireless packet, such as baseband conversion, while causing the time to be included in propagation delay. That is, the control device 100 sets the reception timing of the network node in the wireless section to be shifted by a time obtained by adding up propagation delay from the reference node and a time taken for signal processing such as baseband conversion. As described above, the control device 100 can determine communication timing of a network node in a wireless section in accordance with propagation delay.

5. Examples of Application

<5.1. Example of Application to Remote Robot>

Although, in the above-described embodiment, a case where the communication system 10 provides the game service at the site of the game tournament has been described, an application destination of the communication system 10 is not limited to the game tournament. For example, the communication system 10 can be applied to operations of a remote robot.

For example, when a robot at a remote location is operated, a delay amount in an operation of the robot is preliminarily determined in some cases. Furthermore, there is a case where a small delay amount has been determined and communication with lower delay is required.

In this case, the communication with low delay can be achieved by constructing a local 5G network in an environment in which a remote robot operates and applying the communication system 10 according to the embodiment.

For example, applying the communication system 10 according to the embodiment enables control data to be transmitted by a device (corresponding to first terminal device 400A of embodiment) that controls the remote robot to be transmitted with low delay by the remote robot (corresponding to second terminal device 400B of embodiment).

In contrast, although video data captured and transmitted by a control robot has a large communication capacity, a delay request smaller than the control data is requested. For example, delay of a certain large scale of, for example, approximately 100 ms is allowed. Such data which has a large capacity but for which low delay is not required is transmitted by using a communication path different from that for control data.

This enables the communication system 10 to control the remote robot with lower delay, and enables desired network characteristics to be met in the operations of the remote robot.

<5.2. Example of Application to Vehicle Remote Control>

Furthermore, in addition to the above-described remote robot, the communication system 10 according to the above-described embodiment can also be applied to, for example, vehicle remote control.

When the vehicle remote control is performed, urgent traffic such as a stop signal from a vehicle is desirably transmitted with low delay. Applying the communication system 10 to the vehicle remote control enables control data (e.g., stop signal) to be transmitted by a device (corresponding to first terminal device 400A of embodiment) that controls the vehicle to be transmitted with low delay by the vehicle (corresponding to second terminal device 400B of embodiment).

When the communication system 10 is applied to the vehicle remote control, a network between the device that controls the vehicle and the vehicle is expanded in consideration of movements of the vehicle. That is, a larger number of relay stations 300 performs relay between the device that controls the vehicle and the vehicle, which increases a signal transfer distance. This increases signal propagation delay.

Therefore, a domain (e.g., number of base stations 200 and relay stations 300) managed by the control device 100 is desirably reduced. In this case, the control device 100 selects some base stations 200 (cuts out domain) to be managed from a plurality of base stations 200 such that a requested delay amount is satisfied. The control device 100 restricts the number of base stations 200 to be accommodated in one domain and selects some base stations 200 such that an accumulated total of processing time in a network node and propagation delay does not exceed the requested delay amount.

For example, the control device 100 executes start processing in FIG. 14 for each domain, and determines a communication period and/or timing of communication using a communication path between the device that controls the vehicle and the vehicle.

6. Other Embodiments

The above-described embodiment and the variation thereof are examples, and various modifications and applications are possible.

For example, in the above-described embodiment, when a parameter determined by the control device 100 satisfies a delay request, the control device 100 instructs a network node to use the parameter, but this is not a limitation.

For example, the control device 100 may measure a packet delay time between terminal devices 400 with a plurality of parameters. The control device 100 instructs the network node to use a parameter that satisfies the delay request and that has the shortest packet delay time in accordance with the measurement result.

Furthermore, although, in the above-described embodiment, the control device 100 shortens a waiting time in a transmission queue to achieve lower delay, this is not a limitation. For example, the control device 100 may perform scheduling such that throughput is further increased within a range in which the delay request is satisfied.

Throughput and a delay amount are basically in a trade-off relation. As described above, in the embodiment, the control device 100 performs scheduling so as to reduce the waiting time in a transmission queue as much as possible. When the delay request is satisfied, however, increasing throughput may be more desirable than further reducing the delay time. Thus, the control device 100 may increase the throughput while achieving low delay.

The following methods of increasing throughput while achieving low delay are possible.

(Spatial Multiplexing)

For example, data is transmitted through a plurality of paths by MIMO. As described above, the communication system 10 uses spatial multiplexing of a wireless section by MIMO. This enables the terminal device 400 and the base station 200 to transmit and receive data by using a plurality of paths in the same time slot and increase an amount of data transmitted in a unit time. Although using MIMO increases a signal processing time, the number of symbols transmitted at a time is increased. This enables the communication system 10 to increase throughput while achieving low delay.

(Code Multiplexing)

For example, the control device 100 increases an amount of information transmitted by one signal by controlling the network node so that the network node performs code multiplexing. Although performing code multiplexing increases a signal processing time, the number of symbols transmitted at a time is increased. This enables the communication system 10 to increase throughput while achieving low delay.

(Packet Aggregation)

For example, the control device 100 controls the network node to combine a plurality of packets and generate a combined packet having a maximum size that can be transmitted in a time slot. Since the packets cannot be transmitted until being combined, performing packet aggregation increases a delay time. In contrast, the packet aggregation increases a size transmitted at a time. This enables the communication system 10 to increase throughput.

(Reduction in Guard Time)

For example, the control device 100 controls a network node to reduce a guard time provided for a packet in a wired section. Shortening a guard time between time slots (corresponding to period in which transmission right is given, that is, communication period) in a wired section lengthens the time slots, and increases throughput. In contrast, shortening the guard time increases the probability of transmission failures due to packet collision. For example, when packet discarding due to collision occurs, a network node that has transmitted the packet cannot transmit the discarded packet until obtaining the next transmission right, which increases delay. Therefore, the control device 100 shortens the guard time in accordance with, for example, desired throughput and a collision probability.

Furthermore, although, in the above-described embodiment, the terminal device 400 sequentially performs the signal processing and the communication processing, this is not a limitation. For example, the terminal device 400 may perform a part of the signal processing and a part of the communication processing in parallel. In this case, the terminal device 400 calculates the communication allowed period T2 in accordance with the parallel processing.

For example, the control device 100 of the above-described embodiment and the variation thereof and the control device that controls a network node may be implemented by a dedicated computer system or a general-purpose computer system.

For example, a communication program for executing the above-described operation is stored in a computer-readable recording medium such as an optical disk, a semiconductor memory, a magnetic tape, and a flexible disk to be distributed. Then, for example, the program is installed in a computer, and the above-described processing is executed to constitute a control device. In this case, the control device may be a device (e.g., personal computer) outside the control device 100 and a network node. Furthermore, the control device may be a device (e.g., control unit 130) inside the control device 100 and the network node.

Furthermore, the above-described communication program may be stored in a disk device of a server device on a network such as the Internet so that the communication program can be, for example, downloaded to the computer. Furthermore, the above-described functions may be implemented by cooperation of an operating system (OS) and application software. In this case, a part other than the OS may be stored in a medium to be distributed, or the part other than the OS may be stored in a server device so that the part can be, for example, downloaded to the computer.

Furthermore, among pieces of processing described in the above-described embodiment and the variation thereof, all or part of processing described as being performed automatically can be performed manually, or all or part of processing described as being performed manually can be performed automatically by a known method. In addition, the processing procedures, the specific names, and information including various pieces of data and parameters in the above-described document and drawings can be optionally changed unless otherwise specified. For example, various pieces of information in each figure are not limited to the illustrated information.

Furthermore, each component of each illustrated device is functional and conceptual, and does not necessarily need to be physically configured as illustrated. That is, the specific form of distribution/integration of each device is not limited to the illustrated one, and all or part of the device can be configured in a functionally or physically distributed/integrated manner in any unit in accordance with various loads and usage situations. Note that the configuration by the distribution/integration may be dynamically performed.

Furthermore, the above-described embodiment can be appropriately combined in a region where the processing contents do not contradict each other. Furthermore, the order of steps in the flowcharts or/and the sequence diagrams of the above-described embodiment can be appropriately changed.

Furthermore, for example, the embodiment can be carried out as any configuration constituting a device or a system, for example, a processor serving as a system large scale integration (LSI) or the like, a module using a plurality of processors or the like, a unit using a plurality of modules or the like, a set obtained by further adding other functions to the unit (i.e., configuration of part of device), and the like.

Note that, in the embodiment, a system means an assembly of a plurality of components (e.g., devices and modules (parts)), and it does not matter whether or not all the components are in the same housing. Therefore, a plurality of devices housed in separate housings and connected via a network and one device in which a plurality of modules is housed in one housing are both systems.

Furthermore, for example, the embodiment can adopt a configuration of cloud computing in which one function is shared and processed by a plurality of devices in cooperation via a network.

7. Conclusion

Although the embodiment of the present disclosure has been described above, the technical scope of the present disclosure is not limited to the above-described embodiment as it is, and various modifications can be made without departing from the gist of the present disclosure. Furthermore, components of different embodiments and variations may be appropriately combined.

Furthermore, the effects in the embodiment described in the present specification are merely examples and not limitations. Other effects may be exhibited.

Note that the present technique can also have the configurations as follows.

(1)

An information processing device comprising a control unit that:

determines, for a communication path, a communication period in which wireless communication and wired communication are performed by using the communication path between terminal devices connected to different base stations, the communication path including a wireless section between a terminal device and a base station and a wired section between the different base stations; and notifies the terminal device and the base station of information on the communication period that has been determined.

(2)

The information processing device according to (1), wherein the control unit determines the communication period based on a communication allowed time in accordance with an application and a number of the communication path.

(3)

The information processing device according to (1) or (2), wherein the communication path includes a relay station that relays communication between different base stations.

(4)

The information processing device according to (3), wherein the control unit determines timing when at least one of the base station and the relay station starts the wired communication in accordance with propagation delay of the wired section.

(5)

The information processing device according to (3) or (4), wherein the terminal device, the base station, and the relay station are mutually time-synchronized.

(6)

The information processing device according to any one of (3) to (5), wherein the control unit:

determines a total wired period that is allowed to be used in the wired communication among communications between a plurality of terminal devices in accordance with a communication allowed time, signal processing times in the terminal device, the base station, and the relay station, and a communication time in the wireless section; and determines, for each of the plurality of terminal devices, an individual wired period that is allowed to be used in the wired communication in accordance with the total wired period and a number of the plurality of terminal devices.

(7)

The information processing device according to any one of (3) to (6), wherein the control unit:

determines a total wireless period that is allowed to be used in the wireless communication among the communications between the plurality of terminal devices in accordance with a communication allowed time, signal processing times in the terminal device, the base station, and the relay station, and a communication time in the wired section; and determines, for each of the plurality of terminal devices, a wireless resource that is allowed to be used in the wireless communication in accordance with the total wireless period and a number of the plurality of terminal devices.

(8)

The information processing device according to any one of (1) to (7), wherein, when a communication time in a case where the terminal device performs communication in the communication period that has been determined is longer than a communication time requested in an application, the control unit redetermines the communication period.

(9)

The information processing device according to (8), wherein, when redetermining the communication period, the control unit changes wireless information to be used in the wireless section, and redetermines the communication period.

(10)

The information processing device according to any one of (1) to (9), wherein the terminal device uses the communication path as the communication path of traffic in which low delay is required.

(11)

A communication device comprising a control unit that:

acquires information on a communication period in which wireless communication and wired communication are performed by using a communication path between terminal devices connected to different base stations, the communication path including a wireless section between a terminal device and a base station and a wired section between the different base stations, the communication period having been determined for the communication path; and performs communication in the communication period that has been acquired.

(12)

An information processing method comprising:

determining, for a communication path, a communication period in which wireless communication and wired communication are performed by using the communication path between terminal devices connected to different base stations, the communication path including a wireless section between a terminal device and a base station and a wired section between the different base stations; and notifying the terminal device and the base station of information on the communication period that has been determined.

REFERENCE SIGNS LIST

10 COMMUNICATION SYSTEM
100 CONTROL DEVICE
110, 230, 310 NETWORK COMMUNICATION UNIT
120, 220, 320, 420 STORAGE UNIT
130, 240, 330, 430 CONTROL UNIT
200 BASE STATION
210, 410 WIRELESS COMMUNICATION UNIT
211, 411 RECEPTION PROCESSING UNIT
212, 412 TRANSMISSION PROCESSING UNIT
213, 413 ANTENNA
300 RELAY STATION
400 TERMINAL DEVICE
500 GAME SERVER

The invention claimed is:

1. An information processing device comprising a control unit that:
   determines, for a communication path, a communication period in which wireless communication and wired communication are performed by using the communication path between terminal devices connected to different base stations, the communication path including a wireless section between a terminal device and a base station and a wired section between the different base stations; and
   notifies the terminal device and the base station of information on the communication period that has been determined.

2. The information processing device according to claim 1,
   wherein the control unit determines the communication period based on a communication allowed time in accordance with an application and a number of the communication path.

3. The information processing device according to claim 1,
   wherein the communication path includes a relay station that relays communication between different base stations.

4. The information processing device according to claim 3,
   wherein the control unit determines timing when at least one of the base station and the relay station starts the wired communication in accordance with propagation delay of the wired section.

5. The information processing device according to claim 3,
   wherein the terminal device, the base station, and the relay station are mutually time-synchronized.

6. The information processing device according to claim 3,
   wherein the control unit:
   determines a total wired period that is allowed to be used in the wired communication among communications between a plurality of terminal devices in accordance with a communication allowed time, signal processing times in the terminal device, the base station, and the relay station, and a communication time in the wireless section; and
   determines, for each of the plurality of terminal devices, an individual wired period that is allowed to be used in the wired communication in accordance with the total wired period and a number of the plurality of terminal devices.

7. The information processing device according to claim 3,
   wherein the control unit:
   determines a total wireless period that is allowed to be used in the wireless communication among the communications between the plurality of terminal devices in accordance with a communication allowed time, signal processing times in the terminal device, the base station, and the relay station, and a communication time in the wired section; and
   determines, for each of the plurality of terminal devices, a wireless resource that is allowed to be used in the wireless communication in accordance with the total wireless period and a number of the plurality of terminal devices.

8. The information processing device according to claim 1,
   wherein, when a communication time in a case where the terminal device performs communication in the communication period that has been determined is longer than a communication time requested in an application, the control unit redetermines the communication period.

9. The information processing device according to claim 8,
   wherein, when redetermining the communication period, the control unit changes wireless information to be used in the wireless section, and redetermines the communication period.

10. The information processing device according to claim 1,
   wherein the terminal device uses the communication path as the communication path of traffic in which low delay is required.

11. A communication device comprising a control unit that:
   acquires information on a communication period in which wireless communication and wired communication are performed by using a communication path between terminal devices connected to different base stations, the communication path including a wireless section between a terminal device and a base station and a wired section between the different base stations, the communication period having been determined for the communication path; and
   performs communication in the communication period that has been acquired.

12. An information processing method comprising:
   determining, for a communication path, a communication period in which wireless communication and wired communication are performed by using the communication path between terminal devices connected to different base stations, the communication path including a wireless section between a terminal device and a base station and a wired section between the different base stations; and
   notifying the terminal device and the base station of information on the communication period that has been determined.

* * * * *